US012794805B2

(12) United States Patent
Gulrajani et al.

(10) Patent No.: US 12,794,805 B2
(45) Date of Patent: Nov. 10, 2026

(54) OPTIMIZED ROUTING INFORMATION UPDATE FOR BORDER GATEWAY PROTOCOL PEERS

(71) Applicant: Cisco Technology, Inc., San Jose, CA (US)

(72) Inventors: Sameer R. Gulrajani, Fremont, CA (US); Swadesh Agrawal, San Jose, CA (US); Anbu Gunalan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 71 days.

(21) Appl. No.: 18/929,421

(22) Filed: Oct. 28, 2024

(65) Prior Publication Data

US 2026/0121978 A1 Apr. 30, 2026

(51) Int. Cl.
*H04L 45/745* (2022.01)
*H04L 45/00* (2022.01)
*H04L 45/02* (2022.01)

(52) U.S. Cl.
CPC ............ *H04L 45/745* (2013.01); *H04L 45/02* (2013.01); *H04L 45/20* (2013.01)

(58) Field of Classification Search
CPC ....... H04L 45/745; H04L 45/76; H04L 45/74; H04L 45/02; H04L 45/20
USPC .......................................................... 709/238
See application file for complete search history.

(56) References Cited

U.S. PATENT DOCUMENTS

| | | | | |
|---|---|---|---|---|
| 10,771,309 B1 * | 9/2020 | Chen | H04L 41/0816 | |
| 10,992,566 B1 | 4/2021 | Dave | | |
| 11,848,852 B1 | 12/2023 | Sharma et al. | | |
| 12,063,225 B1 * | 8/2024 | Wan | G06N 20/00 | |
| 2007/0258376 A1 * | 11/2007 | Li | H04L 45/46 | 370/238 |
| 2008/0307110 A1 * | 12/2008 | Wainner | H04L 63/104 | 709/238 |
| 2010/0232300 A1 * | 9/2010 | Kashima | H04L 45/021 | 370/242 |

(Continued)

FOREIGN PATENT DOCUMENTS

| | | | |
|---|---|---|---|
| CN | 102104540 A | 6/2011 | |
| CN | 112040492 B * | 7/2022 | H04W 40/24 |
| WO | WO-2020088684 A1 * | 5/2020 | H04L 45/02 |

*Primary Examiner* — Ruolei Zong
(74) *Attorney, Agent, or Firm* — Rutan & Tucker, LLP; Ravi Mohan; Marc A. McClain

(57) ABSTRACT

Existing network routing strategies fail to handle resource overloads caused by surges in routing information from network nodes during specific events. To address this, devices, systems, methods, and processes for facilitating an optimized routing strategy are described herein. An information update logic, coupled to various network nodes, identifies a set of network nodes having a common identifier and operates the identified set as a single logical entity. The information update logic receives routing information corresponding to a route prefix from one or more network nodes in the set and determines whether the routing information is received from each network node in the set. If the routing information is received from each network node in the set, the received routing information corresponding to the route prefix is propagated to a routing table. If not, the propagation of the routing information to the routing table is stalled.

19 Claims, 8 Drawing Sheets

(56) References Cited

U.S. PATENT DOCUMENTS

| | | | | |
|---|---|---|---|---|
| 2015/0271011 | A1* | 9/2015 | Neginhal | H04L 41/0895 370/254 |
| 2021/0067463 | A1* | 3/2021 | Mukhopadhyay | H04L 45/42 |
| 2021/0258256 | A1* | 8/2021 | Wang | H04L 45/74 |
| 2021/0409304 | A1* | 12/2021 | Zhuang | H04L 45/04 |
| 2022/0116311 | A1 | 4/2022 | Mestery et al. | |
| 2022/0224629 | A1 | 7/2022 | Mada et al. | |
| 2023/0216863 | A1* | 7/2023 | Visen | H04L 9/3263 726/4 |
| 2024/0073135 | A1* | 2/2024 | Dharmshaktu | H04L 45/741 |
| 2024/0205131 | A1* | 6/2024 | Rajamanickam | H04L 45/26 |
| 2025/0141780 | A1* | 5/2025 | Wang | H04L 45/123 |
| 2025/0286808 | A1* | 9/2025 | Dong | H04L 45/021 |
| 2025/0337685 | A1* | 10/2025 | Nanduri | H04L 45/74 |

* cited by examiner

OPTIMIZED ROUTING INFORMATION UPDATE FOR BORDER GATEWAY PROTOCOL PEERS

The present disclosure relates to communication networks. More particularly, the present disclosure relates to routing information update for border gateway protocol peers.

BACKGROUND

The fast-paced advancements in data center requirements have created a need for networking solutions that effectively manage higher traffic volumes and offer scalable, high-performance connectivity. In Web Data Center (Web-DC) use cases, data centers with a large number of Equal-Cost Multi-Path (ECMP) paths, advertised via Border Gateway Protocol (BGP), are becoming increasingly common. BGP is widely used in such large-scale data centers to manage the routing of data between network devices, taking advantage of ECMP to distribute traffic evenly across multiple paths. This helps to maximize bandwidth utilization and improve redundancy. Within a data center tier, network devices share ECMP paths, enabling efficient traffic distribution and load balancing. To simplify operations, different Autonomous System Numbers (ASNs) are assigned to sets of network devices within a single tier. For example, in a sample network topology, 44 leaf nodes may be divided across three ASNs. In large data center deployments, there can be as many as 1024 leaf nodes in a tier, with different groups of leaf nodes assigned different ASNs.

A key aspect of managing these large-scale networks is handling route prefixes. However, this task is complicated by the limited hardware (HW) ECMP resources available on the network devices. In a steady state, where most route prefixes share the same set of ECMP paths, the system operates efficiently. Yet during certain events, such as migration, new section bring-ups, or the like, the order in which the route prefixes are learnt can vary significantly across network devices. This variability can lead to a transient state where network devices are overwhelmed with an excessive number of ECMP sets due to the diversity in the next-hop combinations, potentially causing resource exhaustion. The dynamic and often unpredictable nature of these events further exacerbates the difficulty of managing ECMP resources, underscoring a limitation in current networking hardware and practices in large-scale Web-DC environments.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
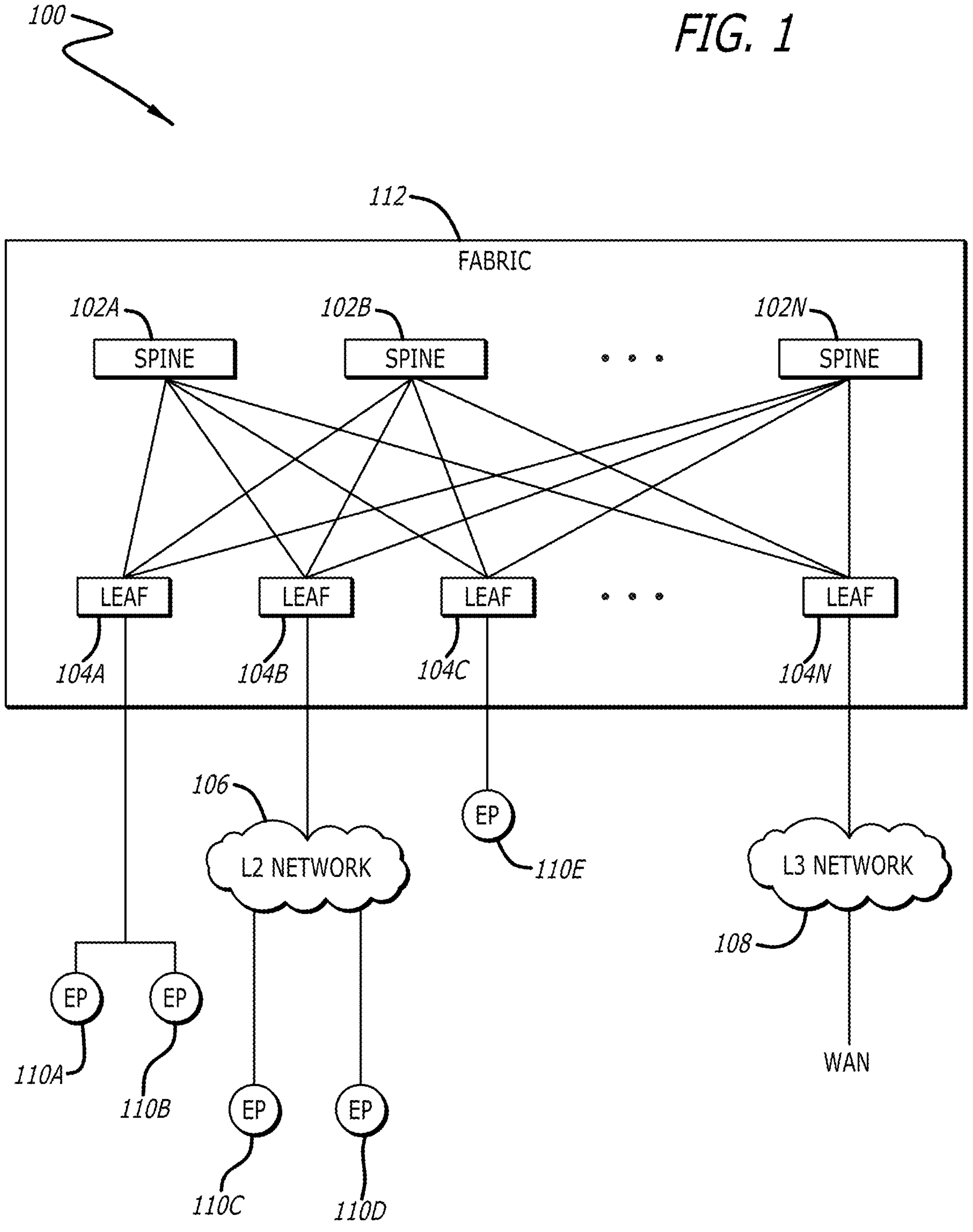
FIG. 1 is a schematic block diagram of an example architecture for a network fabric in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

SUMMARY OF THE DISCLOSURE

Systems and methods for facilitating enhanced device address rotation management in accordance with embodiments of the disclosure are described herein. In many embodiments, a device, comprising a processor, a network interface controller, and a memory, is provided. The network interface controller is configured to provide access to a network comprising a plurality of network nodes. The memory comprises an information update logic that is configured to identify, among the plurality of network nodes, a set of network nodes associated with a common identifier, receive, from one or more network nodes of the set of network nodes, routing information corresponding to a route prefix, determine whether the routing information corresponding to the route prefix is received from each of the set of network nodes, and propagate the received routing information to a routing table in response to determining that the routing information is received from each of the set of network nodes.

In a number of embodiments, the routing table includes a routing information base.

In a variety of embodiments, the routing table includes a forward information base.

In more embodiments, the information update logic is further configured to create a next hop table based on the identification of the set of network nodes associated with the common identifier.

In additional embodiments, the next hop table includes an entry that maps the set of network nodes to the common identifier.

In further embodiments, propagating the routing information to the routing table includes downloading the routing information corresponding to the route prefix to the routing table.

In still more embodiments, the common identifier is an autonomous system number (ASN).

In still further embodiments, the device acts as a Border Gateway Protocol (BGP) speaker.

In still additional embodiments, the plurality of network nodes are BGP peers of the device.

In some more embodiments, the information update logic is further configured to operate the set of network nodes associated with the common identifier as a single logical entity.

In yet more embodiments, the routing information corresponding to the route prefix is received in a random order from the one or more network nodes of the set of network nodes.

In still yet more embodiments, the information update logic is further configured to stall the propagation of the routing information in response to determining that additional routing information corresponding to the route prefix is yet to be received from at least one network node of the set of network nodes.

In many further embodiments, a device, comprising a processor, a network interface controller, and a memory, is provided. The network interface controller is configured to provide access to a network comprising a plurality of network nodes. The memory comprises an information update logic that is configured to identify, among the plurality of network nodes, a set of network nodes associated with a common identifier, receive routing information corresponding to a route prefix from one or more network nodes of the set of network nodes, activate a timer in response to receiving the routing information corresponding to the route prefix from the one or more network nodes, and propagate the received routing information corresponding to the route prefix to a routing table in response to an expiration of the timer.

In many additional embodiments, the timer is associated with a configurable time interval.

In still yet further embodiments, the information update logic is further configured to determine that additional routing information corresponding to the route prefix is yet to be received from at least one network node of the set of network nodes.

In still yet additional embodiments, the information update logic is further configured to propagate the received routing information to the routing table in response to the expiration of the timer regardless of whether the additional routing information corresponding to the route prefix is received from the at least one network node of the set of network nodes.

In several embodiments, a method is provided. The method comprises identifying, among a plurality of network nodes, a set of network nodes associated with a common identifier, receiving, from one or more network nodes in the set of network nodes, routing information corresponding to a route prefix, determining whether an update criteria for the route prefix is satisfied, and propagating the received routing information to a routing table based on the update criteria for the route prefix being satisfied.

In several more embodiments, determining whether the update criteria for the route prefix is satisfied includes determining whether the routing information corresponding to the route prefix is received from each of the set of network nodes.

In numerous embodiments, the received routing information is propagated to the routing table in response to determining that the routing information is received from each of the set of network nodes.

In numerous additional embodiments, determining whether the update criteria for the route prefix is satisfied includes determining whether a timer associated with the route prefix has expired. The received routing information is propagated to the routing table in response to the expiration of the timer.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

DETAILED DESCRIPTION

In response to the issues described above, devices and methods are discussed herein to facilitate routing information update for Border Gateway Protocol (BGP) peers in a data center tier. BGP, an exterior gateway protocol, is utilized to exchange routing information between different networks on the Internet. BGP determines optimal data paths based on various attributes such as network policies, network path attributes, routing policies, or the like. In large data centers, BGP handles routing between network devices and utilizes Equal-Cost Multi-Path (ECMP) for traffic distribution. Data centers are often classified into tiers to assess their reliability, availability, and redundancy. Generally, network devices within a data center tier share ECMP paths, and different Autonomous System Numbers (ASN) are assigned to groups of network devices within a single tier for organization. For example, a data center with 44 leaf nodes may use three ASNs, each managing different groups of leaf nodes (e.g., 16 leaf nodes per ASN and 12 leaf nodes in the last ASN). Within each ASN, BGP speakers (e.g., spine nodes) establish peering connections with leaf nodes (also referred to as BGP peers). This peering allows the BGP speakers to exchange routing information, such as route prefixes (e.g., Internet protocol "IP" prefixes), and receive route advertisements about specific route prefixes from corresponding BGP peers, detailing the paths to specific IP addresses.

Despite various improvements offered by BGP, limited hardware (HW) ECMP resources available on network devices pose a significant challenge. In a steady state, when most route prefixes share the same set of ECMP paths, the network functions efficiently. However, there are certain network events (for example, migration, new section bring-ups, or the like) that can cause network churn. The term "network churn" may refer to periods of frequent and rapid changes in network routing information. These events can lead to instability and inefficiencies in the network as routing tables are constantly updated and adjusted to reflect the new state of the network. Thus, during a network churn event, the order in which route prefixes are learnt can vary significantly across network devices. This variability can lead to a temporary state where network devices are overwhelmed with an excessive number of ECMP sets due to the diversity in the next-hop combinations, potentially causing resource exhaustion. The dynamic and unpredictable nature of these events further complicates the management of ECMP resources.

Therefore, the present disclosure provides a network device (e.g., a BGP speaker, a router, a spine node, or the like) that can facilitate ASN based routing information update for BGP peers (e.g., leaf nodes, routers, or any other BGP-enabled network node) to prevent the exhaustion of HW ECMP resources during network churn events. “BGP peers” may include, for example, network nodes that exchange routing information using the BGP. The BGP peers may establish a BGP session between them to share information about network reachability, allowing each network node to make informed decisions about the best network path for routing traffic.

In many embodiments, a BGP speaker may include a processor, a transceiver, and a memory communicatively coupled to the processor. In a data center including a plurality of network nodes (e.g., leaf nodes, BGP peers, or the like), each network node may be tracked and identified by unique identifiers. The unique identifier may be an ASN assigned to each network node. The BGP speaker may be communicatively coupled to the plurality of network nodes associated with different ASNs. The BGP speaker may be further equipped with an update information logic (for example, stored in the memory or implemented as a hardware component in the BGP speaker) to facilitate ASN based routing information update for the BGP peers.

In a number of embodiments, the BGP speaker may be configured to identify, among the plurality of network nodes, a set of network nodes associated with a common identifier (e.g., a common ASN). For example, the BGP speaker may identify a first set of network nodes associated with a first ASN and a second set of network nodes associated with a second ASN. In an example, the set of network nodes associated with the common ASN may share the same power source. In several embodiments, the BGP speaker may be configured to create a next hop table based on the identification of the set of network nodes associated with the common identifier. The next hop table may include an entry that maps the set of network nodes to the common identifier. In other words, for the set of network nodes that share an ASN, the BGP speaker may create an entry in the next hop table, that maps the set of network nodes to the common ASN.

In numerous embodiments, the BGP speaker may be configured to operate the set of network nodes associated with the common identifier as a single logical entity. For example, the BGP speaker may receive routing information from several network nodes having the same ASN. Instead of handling routing information of each network node separately, the BGP speaker may group the set of network nodes based on the common ASN and process routing updates for the entire set of network nodes together. In a variety of embodiments, the BGP speaker may receive, from one or more network nodes of the set of network nodes, routing information corresponding to a route prefix (e.g., IP address range). If a network node learns about a new IP prefix, the network node may advertise the route prefix. Consequently, the BGP speaker may receive the routing information from the network nodes. The routing information corresponding to the route prefix may be received in a random order from the one or more network nodes of the set of network nodes. In other words, the routing information about the route prefix can arrive at different times from different network nodes in the set of network nodes. This can happen as each network node may have a different latency, processing time, or network path through the network which can affect the timing of the routing information.

In additional embodiments, the BGP speaker may determine whether the routing information corresponding to the route prefix is received from each of the set of network nodes. In other words, when the BGP speaker receives routing information about a new IP prefix, the BGP speaker may verify if routing information has been received from all network nodes in the set of network nodes. For example, if there are four network nodes in the set of network nodes, the BGP speaker may determine if routing information has been received from all four network nodes. In further embodiments, the BGP speaker may propagate the received routing information to a routing table (e.g., a routing information base “RIB”, a forward information base “FIB”, or the like) in response to determining that the routing information is received from each of the set of network nodes. The “routing table” may refer to a database that is utilized to store the routing information received by the BGP speaker. The routing information may utilized by the BGP speaker to forward data packets. In other words, the BGP speaker may download the routing information corresponding to the route prefix to the routing table once the BGP speaker has received routing information corresponding to the route prefix from all the network nodes in the set of network nodes. However, in certain embodiments, the BGP speaker may determine that routing information corresponding to the route prefix is yet not received from all the set of network nodes. In such a scenario where the BGP speaker determines that additional routing information corresponding to the route prefix is yet to be received from at least one network node of the set of network nodes, the BGP speaker may be configured to stall the propagation of the routing information to the routing table. In other words, if the BGP speaker has received routing information from three network nodes out of a set of four network nodes having the same ASN, the BGP speaker may hold off downloading the route information corresponding to the route prefix to the routing table until the BGP speaker receives routing information from the fourth network node as well.

In still additional embodiments, the BGP speaker may be equipped with a timer (for example, stored in the memory or implemented as a hardware component in the BGP speaker). The timer may be set up for a configurable time duration. In yet more embodiments, the BGP speaker may activate the timer in response to receiving the routing information corresponding to the route prefix from the one or more network nodes and propagate the received routing information corresponding to the route prefix to the routing table in response to an expiration of the timer. In other words, while the timer is active, the BGP speaker may accumulate additional routing information about the route prefix from the remaining network nodes of the set of network nodes. At the expiration of the timer, the BGP speaker may propagate the received routing information to the routing table regardless of whether additional routing information corresponding to the route prefix is yet to be received from at least one network node of the set of network nodes. In other words, if the timer expires before routing information is received from all network nodes in the set, the BGP speaker may propagate the routing information accumulated up to that point in time for the route prefix. This ensures that the BGP speaker does not wait indefinitely for routing information. Thus, the BGP speaker downloads a current state of the received routing information for the route prefix at the expiration of the timer.

Thus, the network device (e.g., BGP speaker) facilitating optimized routing information update for BGP peers may offer several advantages. By operating all the network nodes assigned with a common ASN a single logical entity, changes in routing information update are managed collectively and not individually. That is to say, changes in routing information are not managed individually from one network node to the next, but collectively as a set when the network nodes share a common ASN. Thus, network churn is significantly reduced at network spine since processing time, hardware resources, and memory required to manage changes in the routing information are reduced. The BGP, RIB, FIB, and hardware operations are optimized, aligning their design to handle BGP peers as a single logical entity. The optimized routing information update for BGP peers may further introduce a natural hierarchy in network programming, making policy implementation and troubleshooting more straightforward. Additionally, the optimized routing information update for BGP peers may reduce the number of hardware write operations, alleviating scaling and efficiency challenges.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like), or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to the ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as a field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data. Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of an example architecture 100 for a network fabric 112 in accordance with various embodiments of the disclosure is shown. The network fabric 112 can include spine switches 102A, 102B, . . . 102N (collectively "102") connected to leaf switches 104A,104B,104C, . . . 104N (collectively "104") in the network fabric 112. As those skilled in the art will recognize, networking fabric can refer to a high-speed, high-bandwidth interconnect system that enables multiple devices to communicate with each other efficiently and reliably. It is a network topology that is designed to provide a flexible and scalable infrastructure for data center, cloud environments, and other network elements.

Various embodiments described herein can include a leaf-spine architecture including a plurality of spine switches and leaf switches. Spine switches 102 can be L1 switches in the fabric 112. However, in some cases, the spine switches 102 can also, or otherwise, perform L2 functionalities. Further, the spine switches 102 can support various capabilities, such as, but not limited to, 40 or 10 Gbps Ethernet speeds. To this end, the spine switches 102 can be configured with one or more 40 Gigabit Ethernet ports. In certain embodiments, each port can also be split to support other speeds. For example, a 40 Gigabit Ethernet port can be split into four 10 Gigabit Ethernet ports, although a variety of other combinations are available.

In many embodiments, one or more of the spine switches 102 can be configured to host a proxy function that performs a lookup of the endpoint address identifier to locator mapping in a mapping database on behalf of leaf switches 104 that do not have such mapping. The proxy function can do this by parsing through the packet to the encapsulated tenant packet to get to the destination locator address of the tenant. The spine switches 102 can then perform a lookup of their local mapping database to determine the correct locator address of the packet and forward the packet to the locator address without changing certain fields in the header of the packet.

In various embodiments, when a packet is received at a spine switch (e.g., any of the spine switches 102A to 102N), the spine switch can first check if the destination locator address is a proxy address. If so, the spine switches can perform the proxy function as previously mentioned. If not, the spine switch can look up the locator in its forwarding table and forward the packet accordingly.

In a number of embodiments, one or more spine switches 102 can connect to one or more leaf switches 104 within the fabric 112. Leaf switches 104 can include access ports (or non-fabric ports) and fabric ports. Fabric ports can provide uplinks to the spine switches 102, while access ports can provide connectivity for devices, hosts, endpoints, VMs, or external networks to the fabric 112.

In numerous embodiments, leaf switches reside at the edge of the fabric 112, and can thus represent the physical network edge. In some cases, the leaf switches 104 can be top-of-rack ("ToR") switches configured according to a ToR architecture. In other cases, the leaf switches 104 can be aggregation switches in any particular topology, such as end-of-row (EoR) or middle-of-row (MoR) topologies. The leaf switches 104 can also represent aggregation switches, for example.

In additional embodiments, the leaf switches 104 can be responsible for routing and/or bridging various packets and applying network policies. In some cases, a leaf switch can perform one or more additional functions, such as implementing a mapping cache, sending packets to the proxy function when there is a miss in the cache, encapsulating packets, enforcing ingress or egress policies, etc. Moreover, the leaf switches 104 can contain virtual switching functionalities, such as a virtual tunnel endpoint (VTEP) function. To this end, leaf switches 104 can connect the fabric 112 to an overlay network. In further embodiments, network connectivity in the fabric 112 can flow through the leaf switches 104. Here, the leaf switches 104 can provide servers, resources, endpoints, external networks, or VMs access to the fabric 112, and can connect the leaf switches 104 to each other. In some cases, the leaf switches 104 can connect endpoint groups to the fabric 112 and/or any external networks. Each endpoint group can connect to the fabric 112 via one of the leaf switches 104, for example.

Endpoints 110A-E (shown as "EP") can connect to the fabric 112 via leaf switches 104. For example, endpoints 110A and 110B can connect directly to leaf switch 104A, which can connect endpoints 110A and 110B to the fabric 112 and/or any other one of the leaf switches 104. Similarly, endpoint 110E can connect directly to leaf switch 104C, which can connect endpoint 110E to the fabric 112 and/or any other of the leaf switches 104. On the other hand, endpoints 110C and 110D can connect to leaf switch 104B via L2 network 106. Similarly, the wide area network (WAN) can connect to the leaf switch 104N via L3 network 108.

In certain embodiments, the endpoints 110A-E can include any communication device, such as a computer, a server, a switch, a router, etc. In some cases, the endpoints 110A-E can include a server, hypervisor, a Graphics Processing Unit (GPU), or switch configured with a VTEP functionality which connects an overlay network, with the fabric 112. For example, in some cases, the endpoints 110A-E can represent one or more of the VTEPs. The overlay network can host physical devices, such as servers, applications, endpoint groups, virtual segments, virtual workloads, etc. In addition, the endpoints 110A-E can host virtual workload(s), clusters, and applications or services, which can connect with the fabric 112 or any other device or network, including an external network. For example, one or more of the endpoints 110A-E can host, or connect to, a cluster of load balancers or an endpoint group of various applications.

Although a specific embodiment for an architecture 100 is described above with respect to FIG. 1, any of a variety of systems and/or processes may be utilized in accordance with embodiments of the disclosure. For example, the architecture 100 could include any variety of endpoints, spine switches, and/or leaf switches. The elements depicted in FIG. 1 may also be interchangeable with other elements of FIG. 2-8 as required to realize a particularly desired embodiment. More details about an overlay network are described in more detail below.

Figure 2:
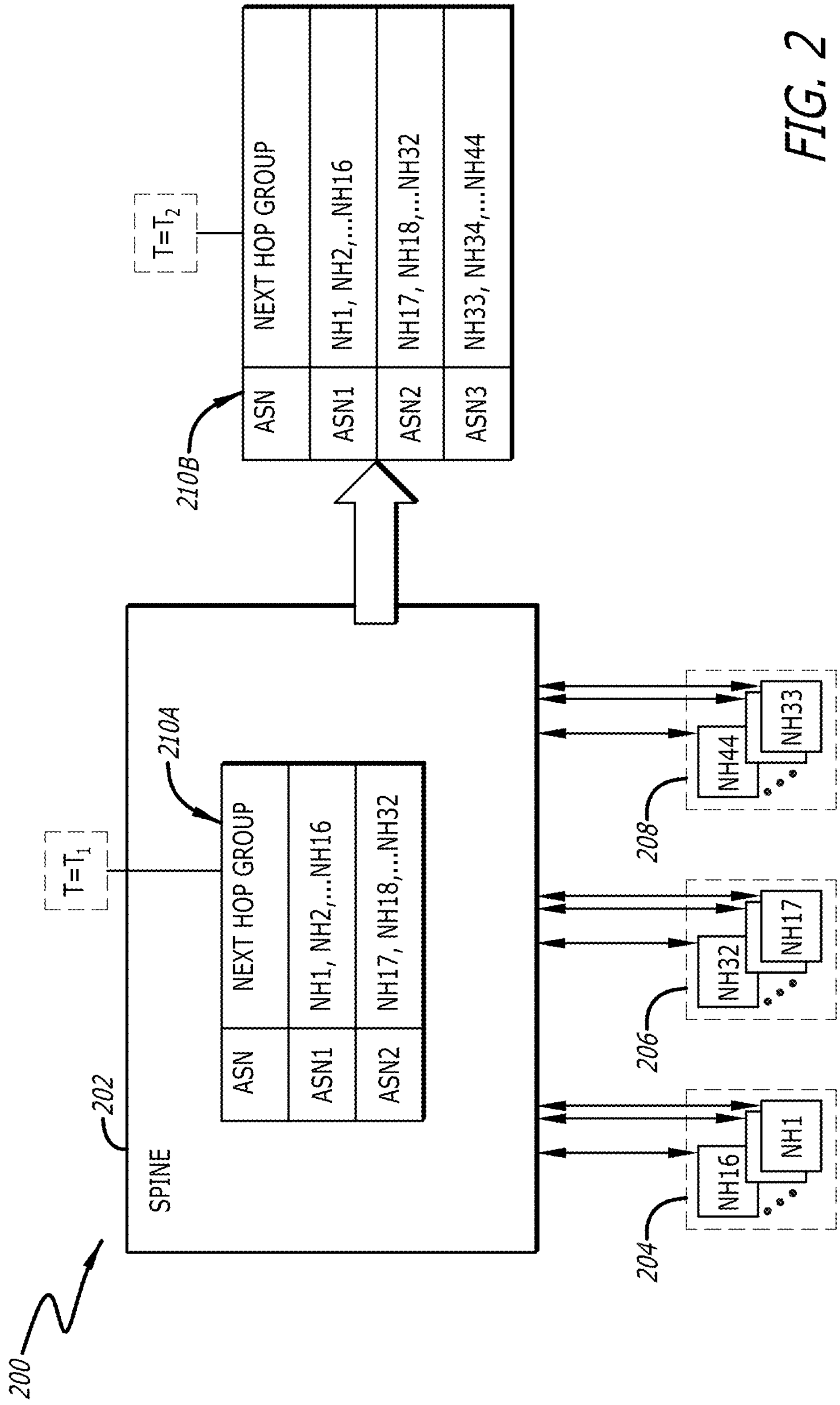
FIG. 2 is a schematic block diagram of an example network fabric in accordance with various embodiments of the disclosure.

Referring to FIG. 2, a schematic block diagram of an example network fabric 200 in accordance with various embodiments of the disclosure is shown. The embodiments depicted in FIG. 2 illustrate the network fabric 200 including a spine node 202 (e.g., a network device, a router, a switch, or the like) communicatively coupled to a plurality of leaf nodes NH1-NH16, NH17-NH32, and NH33-NH44 (e.g., leaf switches, network devices, routers, network nodes, or the like). The network fabric 200 can refer to a high-speed, high-bandwidth interconnect system that enables multiple devices to communicate with each other efficiently and reliably. In many embodiments, the network fabric 200 may utilize Border Gateway Protocol (BGP) for routing, enabling the exchange of routing information update between the spine node 202 and the plurality of leaf nodes NH1-NH16, NH17-NH32, and NH33-NH44, ensuring selection of optimal paths for data transmission, or the like. The network fabric 200 may conform to a network topology designed to provide a flexible and scalable infrastructure for data centers, cloud environments, and other network elements.

In a variety of embodiments, the spine node 202 can be an L1 switch in the network fabric 200. However, in some cases, the spine node 202 can also, or otherwise, perform L2 functionalities. The spine node 202 may operate as the core of the network fabric 200, providing interconnectivity between the plurality of leaf nodes NH1-NH16, NH17-NH32, and NH33-NH44 and ensuring high-speed, low-latency communication across the network fabric 200.

In an example embodiment shown in FIG. 2, the spine node 202 may act as a BGP speaker that is responsible for exchanging routing information between different networks and determining the best paths for data transmission. In further embodiments, the spine node 202 may include a processor, a network interface controller configured to provide access to a network including the plurality of leaf nodes NH1-NH16, NH17-NH32, and NH33-NH44, and a memory coupled to the processor. The memory may include suitable logic, circuitry, and interfaces that are configured to store a machine code and/or the instructions executable by the processor. In an example, the memory may include an information update logic configured to execute one or more operations for preventing ECMP out of resource conditions at the spine node 202. In yet more embodiments, the information update logic can be implemented as a standalone hardware component in the spine node 202. Examples of the processor may include, but are not limited to, an application-specific integrated circuit (ASIC) processor, a complex instruction set computing (CISC) processor, a central processing unit (CPU), an explicitly parallel instruction computing (EPIC) processor, a very long instruction word (VLIW) processor, and/or other processors or circuits. Further, examples of the memory may include, but are not limited to, a random access memory (RAM), a read only memory (ROM), an electrically erasable programmable read-only memory (EEPROM), a hard disk drive (HDD), a solid-state drive (SSD), a CPU cache, a secure digital (SD) card, and/or a cloud-based memory. Furthermore, examples of the network interface controller/card (NIC) may include a gigabit Ethernet adapter or any other similar component.

In various embodiments, the plurality of leaf nodes NH1-NH16, NH17-NH32, and NH33-NH44 may connect to both the spine node 202 and end-point devices (e.g., servers, Graphics Processing Units, storage systems, or the like). Hereinafter, the plurality of leaf nodes NH1-NH16, NH17-NH32, and NH33-NH44 are collectively referred to as "the leaf nodes NH1-NH44"). The leaf nodes NH1-NH44 may reside at the edge of the network fabric 200, and can thus represent the physical network edge. In some cases, the leaf nodes NH1-NH44 can be ToR switches configured according to a ToR architecture. In other cases, the leaf nodes NH1-NH44 can be aggregation switches in any particular topology, such as EoR or MoR topologies. In an example embodiment shown in FIG. 2, the leaf nodes NH1-NH44 may act as BGP peers for the spine node 202.

In yet various embodiments, the leaf nodes NH1-NH44 can be segmented into a plurality of Autonomous Systems (ASes), each identified by a unique Autonomous System Number (ASN). In an example, the leaf nodes NH1-NH44 may be segmented into three ASes such as a first AS 204 associated with a first ASN (denoted by "ASN1"), a second AS 206 associated with a second ASN (denoted by "ASN2"), and a third AS 208 associated with a third ASN (denoted by "ASN3"). This segmentation can be based on several parameters to optimize network performance and manageability. In an example, geographical proximity can be considered as a parameter to reduce latency and improve regional connectivity. Further, traffic volume and patterns can also influence the grouping, ensuring load balancing across ASes. In addition, specific requirements such as security protocols, compliance mandates, and Quality of Service (QoS) levels can contribute to AS segmentation. Each AS is responsible for managing corresponding set of leaf nodes, implementing localized routing policies, and maintaining high availability. Inter-AS communication can be facilitated through, for example, BGP. Segmenting the leaf nodes NH1-NH44 into the plurality of ASes can also provide a means to isolate network failures and maintain redundancy. For example, if a routing delay arises within a specific AS (e.g., the first AS 204), the delay can be contained and managed without affecting other ASes (e.g., the second AS 206 and the third AS 208).

In the example embodiment shown in FIG. 2, the first AS 204 may include a first set of leaf nodes NH1-NH16, the second AS 206 may include a second set of leaf nodes NH17-NH32, and the third AS 208 may include a third set of leaf nodes NH33-NH44. Thus, the first set of leaf nodes NH1-NH16 may be associated with ASN1, the second set of leaf nodes NH17-NH32 may be associated with ASN2, and the third set of leaf nodes NH33-NH44 may be associated with ASN3. In several embodiments, the ASNs can utilized by a BGP speaker (for example, the spine node 202) to manage routing and ensure efficient data transmission between different network nodes (e.g., the leaf nodes NH1-NH44). For example, the BGP speaker may utilize the ASNs to implement equal cost multipath (ECMP) routing, which distributes traffic evenly across multiple network paths to optimize bandwidth usage and improve redundancy.

In numerous embodiments, the spine node 202 may be configured to establish peering sessions with the leaf nodes NH1-NH44 and exchange BGP messages to communicate routing information. A BGP message transmitted by a leaf node may include information regarding the ASN associated with the leaf node. For example, a BGP message transmitted by the leaf node NH1 may include information regarding ASN1 associated with the leaf node NH1. Thus, when a leaf node (e.g., any of the leaf nodes NH1-NH44) transitions to an "UP" state and signals that the BGP session is successfully established, the spine node 202 may be configured to record the ASN associated with the leaf node. Further, the spine node 202 may be configured to dynamically form next-hop groups by evaluating the ASNs of the leaf nodes NH1-NH44 and their operational states (e.g., "UP" or "DOWN"), and create a next-hop table.

In an example scenario shown in FIG. 2, at $T=T_1$, the leaf nodes NH1-NH16, NH17-NH32 may transition to an "UP" state and signal the spine node 202 that BGP session is successfully established. Based on the BGP messages received from the leaf nodes NH1-NH16, and NH17-NH32, the spine node 202 may determine that the first set of leaf nodes NH1-NH16 is associated with a common identifier "ASN1" and the second set of leaf nodes NH17-NH32 is associated with another common identifier "ASN2". Thus, the spine node 202 may identify a first next hop group including the first set of leaf nodes NH1-NH16 associated with the ASN1 and a second next hop group including the second set of leaf nodes NH17-NH32 associated with ASN2. The spine node 202 may then create a next hop table 210A based on the identification of the first set of leaf nodes NH1-NH16 (e.g., the first next hop group) associated with the common identifier ASN1 and the second set of leaf nodes NH17-NH32 (e.g., the second next hop group) associated with the common identifier ASN2. The next hop table 210A may include one or more entries that map an identified set of leaf nodes to the common identifier. For example, the next hop table 210A may include a first entry (e.g., a row) in which the first set of leaf nodes NH1-NH16 (e.g., the first next hop group) is mapped to ASN1 and a second entry in which the second set of leaf nodes NH17-NH32 (e.g., the second next hop group) is mapped to ASN2.

In more embodiments, at $T=T_1$, the third set of leaf nodes NH33-NH44 may not have transitioned to an "UP" state, and therefore the next hop table 210A may not include any entry pertaining to ASN3. Since the third set of leaf nodes NH33-NH44 are not yet integrated in the network fabric 200, an outbound drop policy can be set up to prevent the third set of leaf nodes NH33-NH44 from advertising routing information to the spine node 202. In other words, the "out bound drop policy" may ensure that any routing information from the third set of leaf nodes NH33-NH44 is temporarily withheld from being propagated to the spine node 202, thereby avoiding potential disruptions or instability in the network fabric 200 during the integration or bring-up process. This may enable smoother integration by managing when and how route advertisements from the third set of leaf nodes NH33-NH44 are introduced into the network fabric 200.

As time progresses, the third set of leaf nodes NH33-NH44 may also transition to an "UP" state and signal the spine node 202 that BGP session is successfully established. For example, at $T=T_2$, the third set of leaf nodes NH33-NH44 associated with ASN3 may be inserted into the network fabric 200 and may transition to an "UP" state. After successful insertion of the third set of leaf nodes NH33-NH44 in the network fabric 200, the outbound drop policy can be removed from the third set of leaf nodes NH33-NH44. Once the outbound drop policy is removed, the spine node 202 may receive BGP messages from the third set of leaf nodes NH33-NH44. Based on the BGP messages received from the third set of leaf nodes NH33-NH44, the spine node 202 may determine that the third set of leaf nodes NH33-NH44 is associated with a common identifier "ASN3". Thus, the spine node 202 may identify a third next hop group including the third set of leaf nodes NH33-NH44 associated with ASN3. The spine node 202 may then update the next hop table 210A to obtain an updated next hop table 210B based on the identification of the third set of leaf nodes NH33-NH44 (e.g., the third next hop group) associated with the common identifier ASN3. Thus, the updated next hop table 210B may include a new entry that maps the third set of leaf nodes NH33-NH44 (e.g., the third next hop group) to the common identifier ASN3. In several additional embodiments, the next hop table 210A, 210B created by the spine node 202 may be configured to indicate next hop groups within each ASN from which the spine node 202 expects to learn given route prefixes.

Although a specific embodiment for the network fabric 200 suitable for carrying out the various steps, processes, methods, and operations described herein is discussed with respect to FIG. 2, any of a variety of systems and/or processes may be utilized in accordance with embodiments of the disclosure. For example, though the next hop table 210B is shown to include entries pertaining to three ASNs, an actual implementation can support any number of ASNs within a network fabric, not limited to three as shown in FIG. 2. The elements depicted in FIG. 2 may also be interchangeable with other elements of FIG. 1 and FIG. 3-8 as required to realize a particularly desired embodiment.

Figure 3:
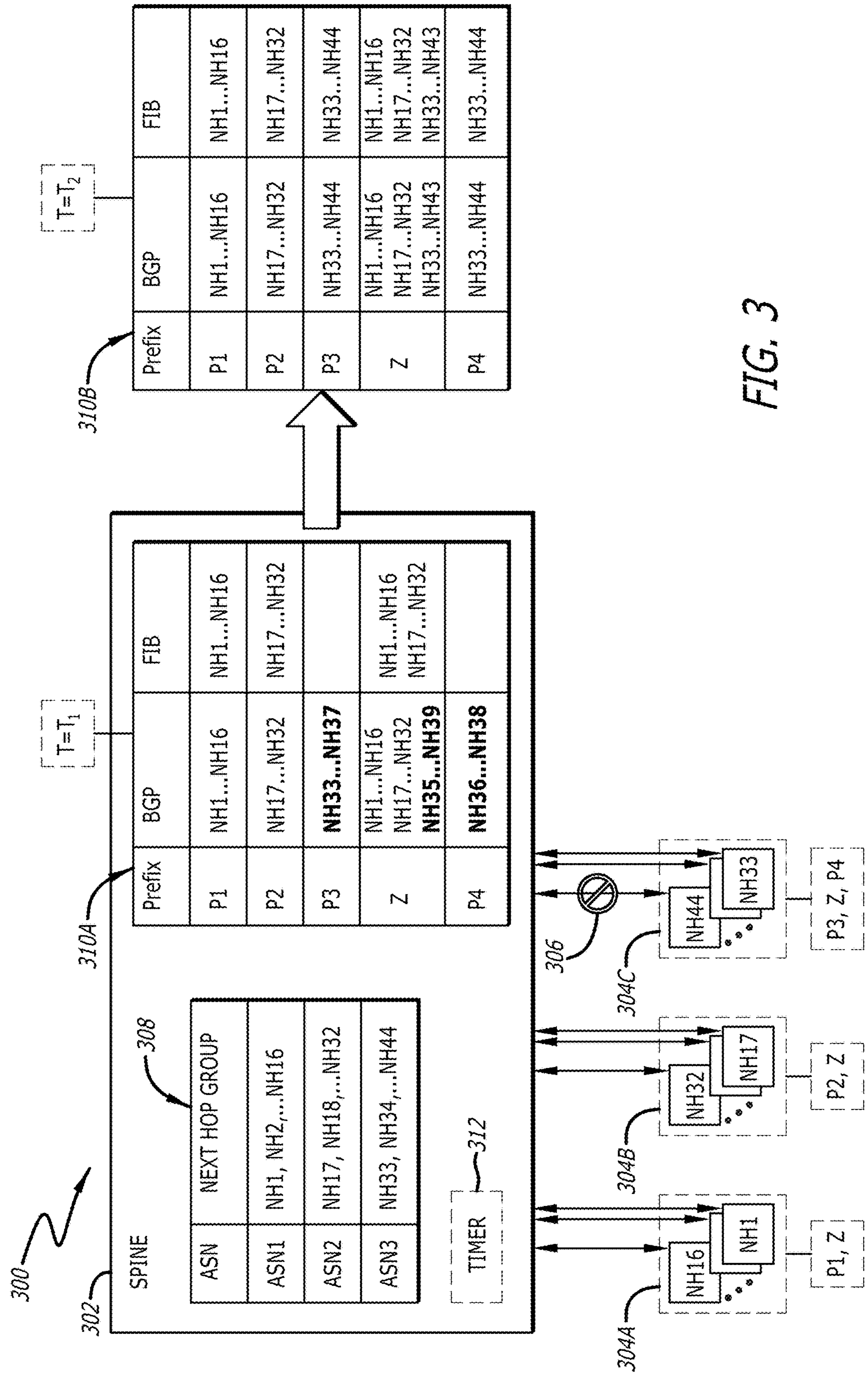
FIG. 3 is a conceptual network diagram of a network fabric facilitating optimized routing information update in accordance with various embodiments of the disclosure.

Referring to FIG. 3, a conceptual diagram of a network device facilitating optimized routing information update in accordance with various embodiments of the disclosure is shown. The embodiments depicted in FIG. 3 illustrate a network fabric 300 including a spine node 302 communicatively coupled to a plurality of network nodes (e.g., leaf nodes NH1-NH16, NH17-NH32, and NH33-NH44). In many embodiments, the network fabric 300 may utilize BGP for managing data routing between the spine node 302 and the leaf nodes NH1-NH16, NH17-NH32, and NH33-NH44. In an example embodiment shown in FIG. 3, the spine node 302 may act as a BGP speaker for facilitating optimized routing information update and the leaf nodes NH1-NH16, NH17-NH32, and NH33-NH44 may act as BGP peers for the spine node 302.

In an example scenario shown in FIG. 3, the leaf nodes NH1-NH44 are segmented into three ASes, such as a first AS 304A, a second AS 304B, and a third AS 304C. Further, the first through third ASes 304A, 304B, and 304C may be associated with unique identifiers "ASN1", "ASN2", and "ASN3", respectively. The first AS 304A may include a first set of leaf nodes NH1-NH16, the second AS 304B may include a second set of leaf nodes NH17-NH32, and the third AS 304C may include a third set of leaf nodes NH33-NH44. Thus, the first set of leaf nodes NH1-NH16 may be associated with ASN1, the second set of leaf nodes NH17-NH32 may be associated with ASN2, and the third set of leaf nodes NH33-NH44 may be associated with ASN3.

In additional embodiments, the spine node 302 may include a processor, a NIC configured to provide access to a network including the leaf nodes NH1-NH44, and a memory coupled to the processor. The memory may include suitable logic, circuitry, and interfaces that are configured to store a machine code and/or the instructions executable by the processor. In an example, the memory may include an information update logic configured to execute one or more operations for preventing ECMP out of resource conditions at the spine node 302. In yet more embodiments, the information update logic can be implemented as a standalone hardware component in the spine node 302. Examples of the processor may include, but are not limited to, an ASIC processor, a CISC processor, a CPU, an EPIC processor, a VLIW processor, and/or other processors or circuits. Further, examples of the memory may include, but are not limited to, a RAM, a ROM, an EEPROM, an HDD, an SSD, a CPU cache, an SD card, and/or a cloud-based memory. Furthermore, examples of the NIC may include a gigabit Ethernet adapter or any other similar component.

In a number of embodiments, the spine node 302 may be configured to form a next hop group by identifying, among the plurality of leaf nodes NH1-NH44, a set of leaf nodes associated with a common identifier. For example, the spine node 302 may form a first next hop group by identifying the first set of leaf nodes NH1-NH16 associated with the common identifier "ASN1". Likewise, the spine node 302 may form second and third next hop groups by identifying the second set of leaf nodes NH17-NH32 associated with the common identifier "ASN2" and the third set of leaf nodes NH33-NH44 associated with the common identifier "ASN3", respectively.

In a variety of embodiments, the spine node 302 may be configured to store, in the memory, a next hop table 308. The next hop table 308 may be configured to indicate next hop groups within each ASN from which the spine node 302 expects to learn route prefixes. For example, as shown in FIG. 3, the next hop table 308 includes the first set of leaf nodes NH1-NH16 (e.g., the first next hop group) mapped to ASN1, the second set of leaf nodes NH17-NH32 (e.g., the second next hop group) mapped to ASN2, and the third set of leaf nodes NH33-NH44 (e.g., the third next hop group) mapped to ASN3. Thus, within ASN1, the spine node 302 may expect to learn route prefixes from the first next hop group including the first set of leaf nodes NH1-NH16. Likewise, within ASN2, the spine node 302 may expect to learn route prefixes from the second next hop group including the second set of leaf nodes NH17-NH32, and within ASN3, the spine node 302 may expect to learn route prefixes from the third next hop group including the third set of leaf nodes NH33-NH44.

In more embodiments, the spine node 302 may be configured to store, in the memory, a routing table (e.g., routing table 310A, 310B). Examples of the routing table may include a routing information base (RIB), a forward information base (FIB), or the like. "RIB" may refer to a database, maintained by the spine node 302, including all possible routes to network destinations known to the spine node 302. For example, RIB may include dynamic routes received from BGP, static routes configured by network administrators, or the like. The RIB can store multiple routes to the same destination, each with different attributes such as path cost or administrative distance. In other words, RIB may act as a repository of routing information, which can be processed by the spine node 302 to determine the most efficient path for data packets. "FIB" may refer to a more streamlined and optimized version of the RIB utilized specifically for actual forwarding of packets. In an example, FIB can be derived from RIB and may include the best paths to each destination. Unlike RIB, which stores multiple potential routes, FIB may include only the most efficient route for each destination. In the example scenario shown in FIG. 3, the spine node 302 is shown to include FIB as the routing table.

In numerous embodiments, the spine node 302 may be configured to operate a set of leaf nodes (e.g., a next hop group) associated with a common identifier (e.g., an ASN) as a single logical entity. For example, the spine node 302 may operate the first set of leaf nodes NH1-NH16 associated with ASN1 as a single logical entity. Likewise, the spine node 302 may operate each of the second set of leaf nodes NH17-NH32 and the third set of leaf nodes NH33-NH44 as a single logical entity. Thus, instead of handling routing information of each leaf node in a next hop group separately, the spine node 302 may process routing updates from all leaf nodes in the next hop group together.

In several embodiments, the spine node 302 may be configured to receive, from one or more leaf nodes in a next hop group (e.g., a set of network nodes), routing information corresponding to a route prefix. In the example scenario shown in FIG. 3, the first set of leaf nodes NH1-NH16 may advertise routing information regarding route prefixes "P1" and "Z", the second set of leaf switches NH17-NH32 may advertise routing information regarding route prefixes "P2" and "Z", and the third set of leaf switches NH33-NH44 may advertise routing information regarding route prefixes "P3", "P4", and "Z". For example, when a leaf node (e.g., any of the leaf nodes NH1-NH44) learns about a new route prefix, the leaf node may advertise routing information regarding the new route prefix to the spine node 302. Consequently, the spine node 302 may receive routing information from the leaf node. However, the spine node 302 may receive routing information corresponding to the route prefix in a random order from leaf nodes in the same next hop group. In other words, the routing information about the route prefix can arrive at different times from different leaf nodes in the same next hop group. This can happen as each leaf node may have a different latency, processing time, or network path through the network which can affect transmission of the routing information to the spine node 302.

In further embodiments, the spine node 302 may be configured to determine whether the routing information corresponding to the route prefix has been received from each leaf node in the next hop group. In other words, in response to receiving routing information corresponding to the route prefix from one or more leaf nodes in a next hop group, the spine node 302 may wait until routing information corresponding to the route prefix is received from remaining leaf nodes in the next hop group. For example, if the spine node 302 receives routing information corresponding to the route prefix "P1" from the leaf node NH2, before processing the routing information, the spine node 302 may determine whether routing information corresponding to the route prefix "P1" has been received from the leaf nodes NH1, NH3-NH16 in the first next hop group (i.e., the first set of leaf nodes NH1-NH16).

In additional embodiments, the spine node 302 may be configured to propagate the received routing information to the routing table stored in the memory in response to determining that the routing information corresponding to the route prefix is received from each leaf node in the next hop group. In other words, if the routing information corresponding to the route prefix is received from each leaf node in the next hop group, the spine node 302 may download the routing information corresponding to the route prefix to the routing table. However, if the spine node 302 determines that additional routing information corresponding to the route prefix is yet to be received from at least one leaf node in the next hop group, the spine node 302 may be configured to stall the propagation of the routing information to the routing table. For example, if the spine node 302 has received routing information corresponding to the route prefix "P1" from the leaf nodes NH1-NH15 but has not received from the leaf node NH16, the spine node 302 may stall the propagation of the routing information corresponding to the route prefix "P1" to the routing table until routing information corresponding to the route prefix "P1" is also received from the leaf node NH16. at $T=T_1$, the spine node 302 may receive routing information regarding the route prefixes "P1" and "Z" from the first set of leaf nodes NH1-NH16. Further, the spine node 302 may receive routing information regarding the route prefixes "P2" and "Z" from the second set of leaf nodes NH17-NH32. Furthermore, the spine node 302 may receive routing information regarding the route prefix "P3" from the leaf nodes NH33-NH37, the route prefix "P4" from the leaf nodes NH36-NH38, and the route prefix "Z" from the leaf nodes NH35-NH39. Since the routing information regarding the route prefixes "P1" and "Z" has been received from all leaf nodes (e.g., the first set of leaf nodes NH1-NH16) in the first next hop group, the spine node 302 may propagate the routing information received from the first set of leaf nodes NH1-NH16 to a routing table 310A. Likewise, the spine node 302 may propagate the routing information received from the second set of leaf nodes NH17-NH32 corresponding to the route prefixes "P2" and "Z" to the routing table 310A. This is illustrated in FIG. 3 where "FIB" column of the routing table 310A has entries corresponding to the first next hop group, i.e., the first set of leaf nodes NH1-NH16, against the route prefixes "P1" and "Z". Likewise, the "FIB" column of the routing table 310A has entries corresponding to the second next hop group, i.e., the second set of leaf nodes NH17-NH32, against the route prefixes "P2" and "Z".

However, the spine node 302 may determine that routing information corresponding to the route prefixes "P3", "P4", and "Z" have not been received from all leaf nodes in the third next hop group. For example, additional routing information regarding the route prefix "P3" is yet to be received from the leaf nodes NH38-NH44. Further, additional routing information regarding the route prefix "P4" is yet to be received from the leaf nodes NH33-NH35 and NH39-NH44. Furthermore, additional routing information regarding the route prefix "Z" is yet to be received from the leaf nodes NH33-NH34 and NH40-NH44. Consequently, the spine node 302 may stall the propagation of routing information corresponding to the route prefixes "P3", "P4", and "Z" for the third next hop group to the routing table 310A. This is illustrated in FIG. 3 where "FIB" column of the routing table 310A does not have any entry for the third next hop group (i.e., the third set of leaf nodes NH33-NH44) against the route prefixes "P3", "P4", and "Z". Such stalling may prevent overwhelming the spine node 302 with an excessive number of ECMP sets due to diversity in the next-hop combinations.

As time progresses, the spine node 302 may also receive routing information corresponding to the route prefixes "P3", "P4", and "Z" from remaining leaf nodes in the third next hop group. For example, at $T=T_2$, routing information corresponding to the route prefixes "P3" and "P4" may have been received from all leaf nodes NH33-NH44 in the third next hop group. Thus, the spine node 302 may update the routing table 310A by propagating the routing information received from the third set of leaf nodes NH33-NH44 corresponding to the route prefixes "P3" and "P4" and obtain an updated routing table 310B. This is illustrated in FIG. 3 where "FIB" column of the routing table 310B includes entries for the third next hop group (i.e., the third set of leaf nodes NH33-NH44) against the route prefixes "P3" and "P4".

In yet more embodiments, for certain route prefixes, even after waiting for a certain time duration, the spine node 302 may not receive additional routing information from remaining leaf nodes of a next hop group. For example, the leaf node NH44 may have an outbound policy block 306 for the route prefix "Z", as a result, routing information from the leaf node NH44 corresponding to the route prefix "Z" may never be received. In order to prevent the spine node 302 waiting indefinitely for receiving routing information from such remaining leaf nodes, in still additional embodiments, the spine node 302 may be equipped with a timer 312 (for example, stored in the memory or implemented as a hardware component in the spine node 302). The timer 312 may be associated with a configurable time interval, defining a time duration for which the spine node 302 will wait for additional routing information from remaining leaf nodes in a next hop group.

In still more embodiments, the spine node 302 may be configured to activate the timer 312 in response to receiving routing information corresponding to a route prefix from one or more leaf nodes in a next hop group and propagate the received routing information corresponding to the route prefix to the routing table 310B in response to an expiration of the timer 312. For example, if routing information from the leaf node NH44 corresponding to the route prefix "Z" is not received and the timer 312 expires, the spine node 302 may propagate the routing information received from the leaf nodes NH33-NH43 corresponding to the route prefix "Z" to the routing table 310A. Thus, the spine node 302 may propagate the received routing information to the routing table 310B in response to the expiration of the timer 312 regardless of whether the additional routing information corresponding to the route prefix "Z" is received from the leaf node NH44. In other words, while the timer 312 is active, the spine node 302 may accumulate additional routing information about the route prefix "Z" from the leaf nodes NH33-NH34 and NH40-NH44 and once the timer 312 expires, indicating that the spine node 302 has waited long enough to receive the additional routing information, the spine node 302 may propagate the routing information received from the leaf nodes NH33-NH43 about the route prefix "Z" to the routing table 310B. This is illustrated in FIG. 3 where "FIB" column of the routing table 310B includes entries for the leaf nodes NH33-NH43 against the route prefix "Z" and does not include an entry for the leaf node NH44 against the route prefix "Z".

Although a specific embodiment illustrating a network device for facilitating optimized routing information update suitable for carrying out the various steps, processes, methods, and operations described herein is discussed with respect to FIG. 3, any of a variety of systems and/or processes may be utilized in accordance with embodiments of the disclosure. In many non-limiting examples, leaf nodes can also act as BGP speakers if the leaf nodes are configured to handle routing functions, exchange BGP information, and receive routing information from another set of network nodes. In many further examples, the operations described above with respect to the spine node 302 can also be performed by network edge devices for facilitating optimized routing information update. The elements depicted in FIG. 3 may also be interchangeable with other elements of FIG. 1-2 and FIG. 4-8 as required to realize a particularly desired embodiment.

Figure 4:
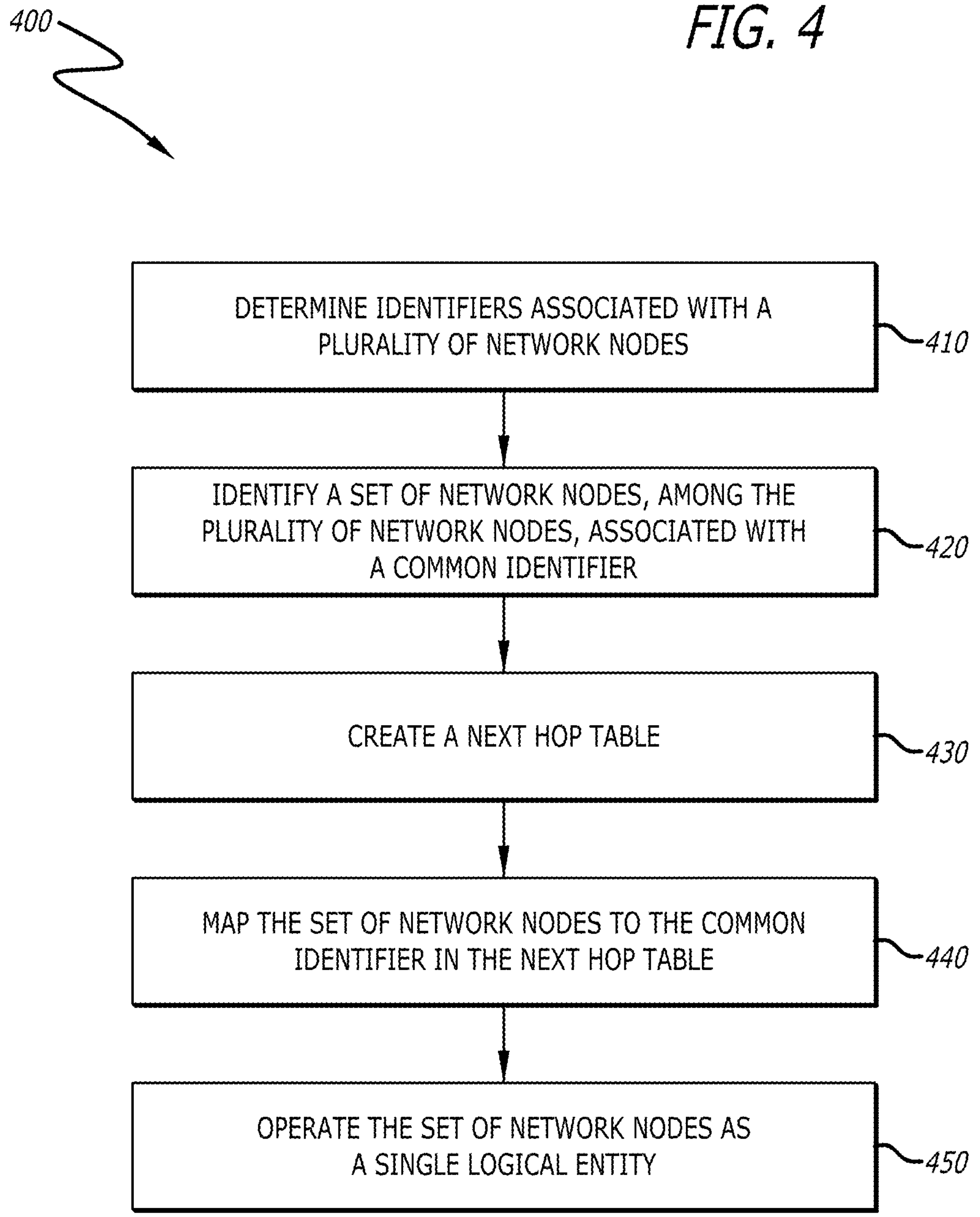
FIG. 4 is a flowchart depicting a process for creation of a single logical entity to facilitate optimized routing information update in accordance with various embodiments of the disclosure.

Referring to FIG. 4, a flowchart depicting a process 400 for creation of a single logical entity to facilitate optimized routing information update in accordance with various embodiments of the disclosure is shown. Consider an example where a device (for example, an edge network device, a spine node, etc.), acting as a BGP speaker, is communicatively coupled to a plurality of network nodes. The device may establish peering connections with the plurality of network nodes and exchange BGP messages including information such as route prefixes, route advertisements about specific route prefixes, or the like.

In many embodiments, the process 400 may determine identifiers associated with the plurality of network nodes (block 410). The plurality of network nodes may include leaf nodes and/or other network nodes deployed in a network fabric. In a variety of embodiments, the plurality of network nodes can be segmented into a plurality of ASes, each identified by a unique identifier such as an ASN. This segmentation can be based on several parameters (for example, geographical proximity, traffic volume and patterns, security protocols, compliance mandates, and QoS levels, power source, or the like) to optimize network performance and manageability. Each AS is responsible for managing corresponding set of network nodes, implementing localized routing policies, and maintaining high availability. Leaf nodes in an AS are also associated with the unique identifier assigned to the AS. In a number of embodiments, a BGP message transmitted by a network node may include information regarding the unique identifier (e.g., ASN) associated with the network node. Thus, based on receiving the BGP messages from the plurality of network nodes, the process 400 may determine the identifiers associated with the plurality of network nodes.

In more embodiments, the process 400 may identify a set of network nodes, among the plurality of network nodes, associated with a common identifier (block 420). For example, based on the BGP messages received from the plurality of network nodes, the process 400 may identify those network nodes that are associated with the same ASN. For example, in a network topology with 44 network nodes, 16 network nodes included in a first AS may be associated with a first ASN, another 16 network nodes included in a second AS may be associated with a second ASN, and remaining 12 network nodes included in a third AS may be associated with a third ASN. Upon receiving BGP messages from these 44 network nodes, the process 400 may identify a first set of network nodes associated with the first ASN, a second set of network nodes associated with the second ASN, and a third set of network nodes associated with the third ASN. In further embodiments, the set of network nodes identified by the process 400 may refer to a next hop group associated with the common identifier (e.g., ASN).

In additional embodiments, the process 400 may create a next hop table (block 430). In yet more embodiments, the process 400 may create the next hop table based on the identification of the set of network nodes associated with the common identifier. In an example, the next hop table may include a list of network nodes within each ASN from which a BGP speaker, executing the process 400, expects to learn given route prefixes. In still more embodiments, if the next hop table is already created, the process 400 may update the next hop table based on the identification of the set of network nodes associated with the common identifier.

In several embodiments, the process 400 may map the set of network nodes to the common identifier in the next hop table (block 440). In other words, when the set of network nodes is part of the same AS and share a common ASN as the identifier, the process 400 may include an entry in the next hop table mapping the set of network nodes to the common ASN. This mapping may ensure that the set of network nodes is treated as part of the same ASN for routing purposes. In several additional embodiments, the next hop table may already include an entry pertaining to a specific ASN. If the process 400 detects any change in the set of network nodes for a given ASN, for example, a new network node being added to the ASN or an existing network node leaving the ASN, the process 400 may update the entry associated with the ASN.

In further additional embodiments, the process 400 may operate the set of network nodes as a single logical entity (block 450). In other words, instead of individually managing routing information from network nodes sharing the common ASN, the process 400 may treat the entire set as one logical entity. For example, the process 400 may receive routing information from several network nodes within the same ASN. Instead of handling routing information of each network node separately, the process 400 may process the routing information once the routing information is received from each network node of the set of network nodes. Such grouping allows the process 400 to process routing updates from the entire set of network nodes at once, rather than for each network node individually. Such approach may reduce the complexity and can enhance network stability by minimizing routing updates and changes. Further, it allows for more efficient handling of network resources and helps in maintaining consistent performance, especially during network events or changes.

Although a specific embodiment for creation of a single logical entity to facilitate optimized routing information update suitable for carrying out the various steps, processes, methods, and operations described herein is discussed with respect to FIG. 4, any of a variety of systems and/or processes may be utilized in accordance with embodiments of the disclosure. For example, since an actual implementation can support any number of ASNs within a network fabric, the process 400 may simultaneously create multiple logical entities for multiple ASNs (e.g., one logical entity per ASN) without deviating from the scope of disclosure. The elements depicted in FIG. 4 may also be interchangeable with other elements of FIG. 1-3 and 5-8 as required to realize a particularly desired embodiment.

Figure 5:
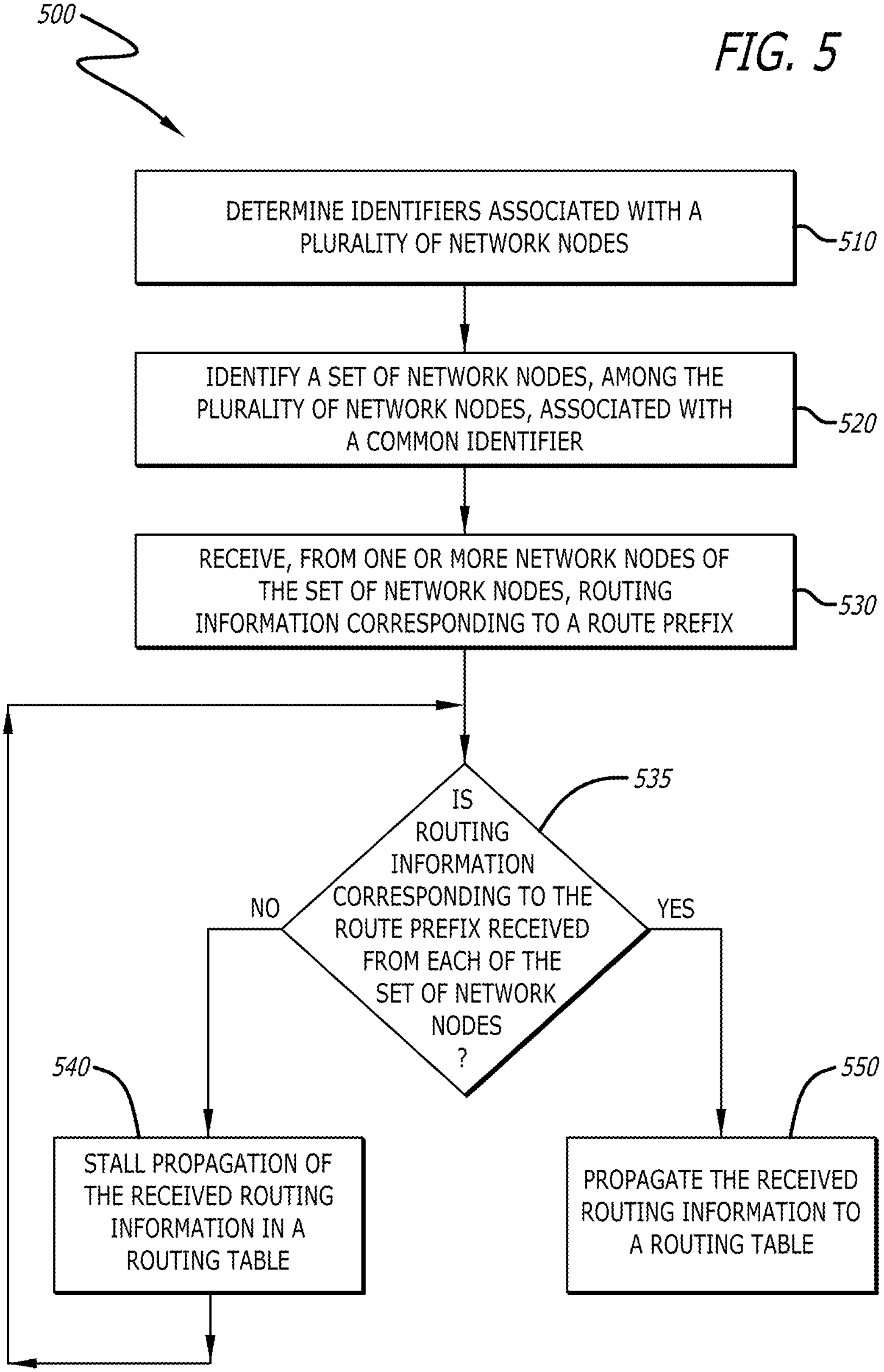
FIG. 5 is a flowchart showing a process for propagation of routing information to a routing table in accordance with various embodiments of the disclosure.

Referring to FIG. 5, a flowchart depicting a process 500 for propagation of routing information update to a routing table in accordance with various embodiments of the disclosure is shown. Consider an example where a device (for example, an edge network device, a spine node, etc.), acting as a BGP speaker, is communicatively coupled to a plurality of network nodes. The device may establish peering connections with the plurality of network nodes and exchange routing information, such as route prefixes (e.g., IP prefixes), route advertisements about specific route prefixes, or the like. The plurality of network nodes may refer to BGP peers of the device.

In many embodiments, the process 500 may determine identifiers associated with the plurality of network nodes (block 510). In a variety of embodiments, the plurality of network nodes can be segmented into a plurality of ASes, each identified by a unique identifier such as an ASN. Each AS may be responsible for managing corresponding set of network nodes. Leaf nodes in an AS are also associated with the unique identifier assigned to the AS. In a number of embodiments, a BGP message transmitted by a network node may include information regarding the unique identifier (e.g., ASN) associated with the network node. Thus, based on receiving the BGP messages from the plurality of network nodes, the process 500 may determine the identifiers associated with the plurality of network nodes. In numerous embodiments, the process 500 may utilize the ASNs to implement Equal Cost Multipath (ECMP) routing among the plurality of network nodes.

In a number of embodiments, the process 500 may identify a set of network nodes, among the plurality of network nodes, associated with a common identifier (block 520). For example, based on the BGP messages received from the plurality of network nodes, the process 500 may identify those network nodes that are associated with the same ASN as belonging to the same next hop group. Further, the process 500 may operate the identified set of network nodes as a single logical entity due to their shared characteristics or functions under the same ASN. For example, because the set of network nodes associated with the common ASN share the same power source, are impacted by the same fiber cuts, etc., the set of network nodes can be considered as one logical entity. Further, operations such as migration and isolation are also conducted on ASN basis, thus impacting the set of network nodes associated with the common ASN as a group.

In a variety of embodiments, the process 500 may receive, from one or more network nodes of the set of network nodes, routing information corresponding to a route prefix (block 530). For example, when a network node among the plurality of network nodes learns about a new route prefix, the network node may advertise routing information corresponding to the new route prefix to the process 500. The routing information associated with the route prefix may include a network path and attributes required for determining the best route for data transmission. Consequently, the process 500 may receive routing information from the network node. In more embodiments, the process 500 may receive the routing information to create or update a routing table for the plurality of network nodes.

In several embodiments, the process 500 may determine whether routing information corresponding to the route prefix is received from each of the set of network nodes (block 535). In other words, the process 500 may check whether routing information corresponding to the route prefix has been received from each network node in the set. For example, the process 500 may receive routing information corresponding to the route prefix in a random order from network nodes within the set of network nodes (e.g., the same next hop group). In other words, the routing information about the route prefix can arrive at different times from different network nodes in the set of network nodes. As a result, the process 500 may receive routing information corresponding to the route prefix from some of the network nodes prior to other network nodes in the set of network nodes. Thus, prior to processing the received routing information about the route prefix, the process 500 may confirm whether routing information corresponding to the route prefix has been received from each network node in the set or not.

In response to the determination that the routing information corresponding to the route prefix is not received from each network node of the set of network nodes, in further embodiments, the process 500 may stall propagation of the received routing information in a routing table (block 540). In other words, the process 500 may wait until all required updates associated with the routing information are obtained from each network node in the set. Hence, the process 500 may continue checking each network node about a receipt of the routing information corresponding to the route prefix (block 535). For example, if there are four network nodes in the set of network nodes, the process 500 may keep checking if routing information has been received from all four network nodes. If the routing information has been received from three network nodes but not from the fourth network node, the process 500 may stall the propagation of the routing information until the routing information from the fourth network node is also received. This may prevent incomplete or inconsistent routing updates in the routing table.

In response to the determination that the routing information corresponding to the route prefix is received from each network node of the set of network nodes, in further additional embodiments, the process 500 may propagate the received routing information to the routing table (block 550). The routing table may include an RIB, an FIB, or the like and can be implemented in a software or hardware by the process 500. In other words, the process 500 may download the routing information corresponding to the route prefix to the routing table once the process 500 has received routing information from all the network nodes in the set (e.g., the next hop group sharing the common ASN). Continuing the above example, once the routing information from the fourth network node is also received, the process 500 may propagate the routing information, received from the set of four network nodes, corresponding to the route prefix to the routing table.

Although a specific embodiment for propagation of routing information suitable for carrying out the various steps, processes, methods, and operations described herein is discussed with respect to FIG. 5, any of a variety of systems and/or processes may be utilized in accordance with embodiments of the disclosure. For example, in many further embodiments, the process 500 may stall the propagation of the received routing information corresponding to a route prefix in the routing table only for a specific time duration. In other words, the process 500 may not wait indefinitely to receive the routing information from all the network nodes in the set and may only wait till the expiration of the specific time duration. The elements depicted in FIG. 5 may also be interchangeable with other elements of FIG. 1-4 and 6-8 as required to realize a particularly desired embodiment.

Figure 6:
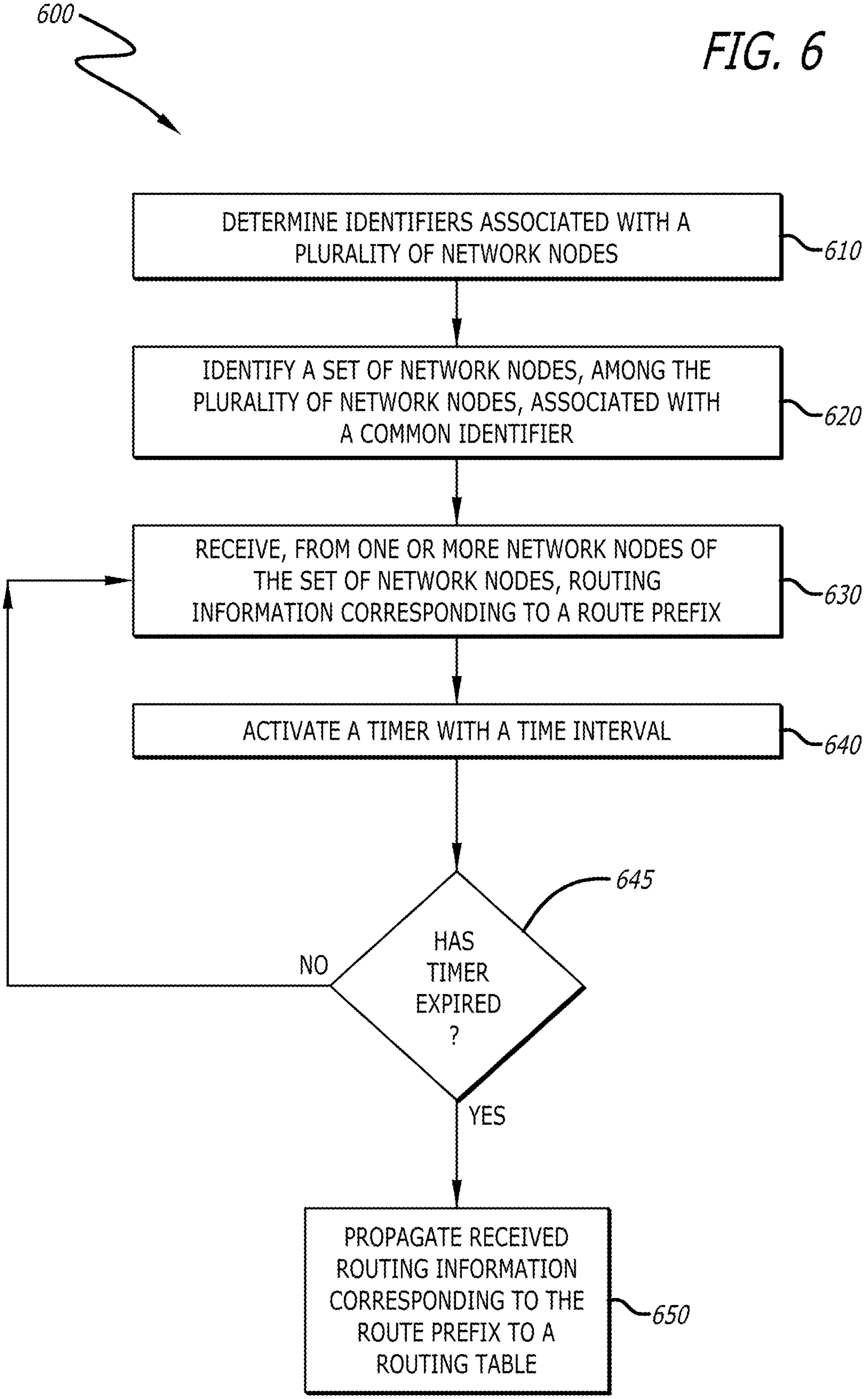
FIG. 6 is a flowchart showing a process for propagation of routing information to a routing table in accordance with various embodiments of the disclosure.

Referring to FIG. 6, a flowchart depicting a process 600 for propagation of routing information to a routing table in accordance with various embodiments of the disclosure is shown. Consider an example where a device (for example, an edge network device, a spine node, etc.), acting as a BGP speaker, is communicatively coupled to a plurality of network nodes. The device may establish peering connections with the plurality of network nodes and exchange BGP messages including, for example, route prefixes, route advertisements about specific route prefixes, or the like. The plurality of network nodes may refer to BGP peers of the device.

In many embodiments, the process 600 may determine identifiers associated with the plurality of network nodes (block 610). In a number of embodiments, the plurality of network nodes may be connected in a spine leaf topology to the device. In more embodiments, the identifiers may include ASNs associated with the plurality of network nodes. In an example, based on several parameters (e.g., geographical proximity, traffic volume and patterns, security protocols, compliance mandates, QoS levels), the plurality of network nodes can be segmented into a plurality of ASes, each identified by a unique identifier such as ASN. In a variety of embodiments, a BGP message transmitted by a network node may include information regarding the unique identifier associated with the network node. Thus, based on receiving the BGP messages from the plurality of network nodes, the process 600 may determine the identifiers associated with the plurality of network nodes.

In further embodiments, the process 600 may identify a set of network nodes, among the plurality of network nodes, associated with a common identifier (block 620). In numerous embodiments, the process 600 may examine network configurations of the plurality of network nodes to determine which network nodes share a common ASN. In additional embodiments, the process 600 may identify the set of network nodes associated with the common identifier based on the BGP messages received from the plurality of network nodes. For example, the process 600 may extract ASN information from the received BGP messages and identify network nodes which have advertised the same ASN as belonging to the set of network nodes, for example, a next hop group.

In yet further embodiments, the process 600 may receive, from one or more network nodes of the set of network nodes, routing information corresponding to a route prefix (block 630). The process 600 may establish BGP peering sessions with the set of network nodes, and when a network node of the set of network nodes learns about a new route prefix, the network node may advertise routing information corresponding to the new route prefix to the process 600. Consequently, the process 600 may receive routing information from the network node. The routing information associated with the route prefix may include a network path and attributes required for determining the best route for data transmission.

In further additional embodiments, the process 600 may activate a timer with a time interval (block 640). The process 600 may activate the timer in response to receiving the routing information corresponding to the route prefix from the one or more network nodes. The timer may be stored in a memory or implemented as a hardware component in the device (e.g., the BGP speaker). The timer may be set for a configurable time interval based on latency, processing time, or network path lag associated with the set of network nodes. For example, the process 600 may receive routing information corresponding to the route prefix in a random order from network nodes within the set of network nodes. In other words, the process 600 can receive routing information corresponding to the route prefix from some network nodes before other network nodes in the set of network nodes, and upon receiving the routing information, the process 600 may activate the timer. While the timer is active, the process 600 may continue to receive routing information corresponding to the route prefix from remaining network nodes of the set of network nodes. The timer may act as a failsafe mechanism to prevent the process 600 from waiting indefinitely to receive routing information from the remaining network nodes of the set of network nodes.

In many further embodiments, the process 600 may determine whether the timer has expired (block 645). In other words, the process 600 may keep track of the start of the timer and check if the timer has timed out. In still more embodiments, upon expiration, the timer may generate a time-out signal. In such embodiments, the process 600 may determine that the timer has expired if the time-out signal is received from the timer, else the process 600 may determine that the timer has not expired.

In response to the expiration of the timer (also referred to as timing out of the timer), in yet more embodiments, the process 600 may propagate the received routing information corresponding to the route prefix to the routing table (block 650). Examples of the routing table may include an RIB, an FIB, or the like. That is to say, once the timer expires, it indicates that the process 600 has waited long enough to receive the routing information from the set of network nodes and that it is time for the routing table to be updated. In one example scenario, at the expiration of the timer, the process 600 may further determine that additional routing information corresponding to the route prefix is yet to be received from at least one network node of the set of network nodes. In such a scenario, in yet many embodiments, the process 600 may propagate the received routing information to the routing table regardless of whether the additional routing information corresponding to the route prefix is received from the at least one network node of the set of network nodes at the expiration of the timer. That is to say, if the timer expires before expected routing information is received from the at least one network node, the process 600 may download a current state of the received routing information for the route prefix to the routing table without waiting any further for the additional routing information from the at least one network node.

However, in response to determining that the timer has not expired, in yet additional embodiments, the process 600 may continue receiving from remaining network nodes of the set of network nodes, additional routing information corresponding to the route prefix (block 630). In other words, while the timer is active, the process 600 may continue to accumulate additional routing information corresponding to the route prefix from each network node of the set of network nodes.

Although a specific embodiment for propagation of routing information suitable for carrying out the various steps, processes, methods, and operations described herein is discussed with respect to FIG. 6, any of a variety of systems and/or processes may be utilized in accordance with embodiments of the disclosure. For example, the process 600 may maintain multiple timers for different sets of network nodes associated with different ASNs. In still yet more embodiments, any failsafe update criteria, not limited to the timer, can be utilized to prevent the process 600 from waiting indefinitely to receive routing information from remaining network nodes of the set of network nodes. The elements depicted in FIG. 6 may also be interchangeable with other elements of FIG. 1-5, 7, and 8 as required to realize a particularly desired embodiment.

Figure 7:
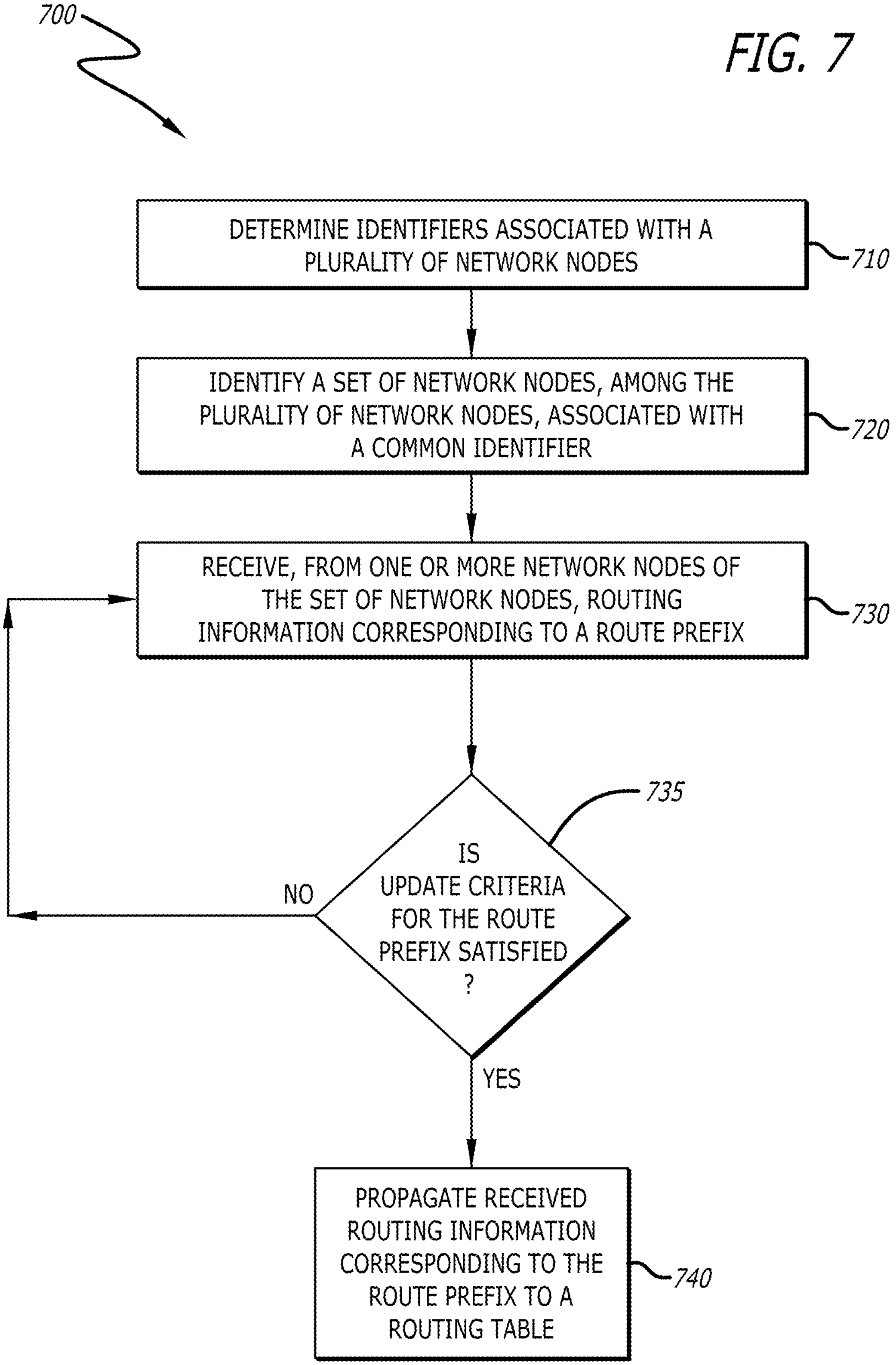
FIG. 7 is a flowchart showing a process for propagation of routing information to a routing table in accordance with various embodiments of the disclosure.

Referring to FIG. 7, a flowchart depicting a process 700 for propagation of routing information to a routing table in accordance with various embodiments of the disclosure is shown. Consider an example where a device (for example, an edge network device, a spine node, etc.), acting as a BGP speaker, is communicatively coupled to a plurality of network nodes. The device may establish peering connections with the plurality of network nodes and exchange BGP messages including information such as route prefixes, route advertisements about specific route prefixes, or the like. The plurality of network nodes may refer to BGP peers of the device. The process 700 may be configured to execute an information update logic for propagating the routing information to the routing table.

In many embodiments, the process 700 may determine identifiers associated with a plurality of network nodes (block 710). In an example, the plurality of network nodes may be leaf switches in a network fabric, a data center, or the like. In more embodiments, the identifiers may include ASNs associated with the plurality of network nodes. The plurality of network nodes may be associated with ECMP paths advertised via BGP. For example, the plurality of network nodes may transmit BGP messages. In numerous embodiments, a BGP message transmitted by a network node may include information regarding the unique identifier (e.g., ASN) associated with the network node. Thus, based on receiving the BGP messages from the plurality of network nodes, the process 700 may determine the identifiers associated with the plurality of network nodes.

In a variety of embodiments, the process 700 may identify a set of network nodes, among the plurality of network nodes, associated with a common identifier (block 720). For example, the process 700 may identify a first set of network nodes to be associated with a specific ASN while a second set of network nodes to be associated with a different ASN. The set of network nodes associated with the common ASN may share the same power source and may correspond to a next hop group. In further embodiments, the process 700 may operate the set of network nodes associated with the common ASN as a single logical entity to handle ECMP routing. This identification of the set of network nodes sharing the common ASN may enable the process 700 to handle routing updates for the set of network nodes together, rather than for each network node individually.

In a number of embodiments, the process 700 may receive, from one or more network nodes of the set of network nodes, routing information corresponding to a route prefix (block 730). For example, if a network node learns about a new route prefix, the network node may advertise the route prefix. Consequently, the process 700 may receive the routing information about the route prefix.

In several embodiments, the process 700 may determine whether an update criteria for the route prefix is satisfied (block 735). The update criteria may refer to one or more conditions which when satisfied can cause the process 700 to propagate the received routing information corresponding to the route prefix in the routing table. In some embodiments, determining whether the update criteria for the route prefix is satisfied may include determining whether the routing information corresponding to the route prefix is received from each network node of the set of network nodes. In certain embodiments, determining whether the update criteria for the route prefix is satisfied may include determining whether a timer associated with the route prefix has expired. If the update criteria for the route prefix is not satisfied, in additional embodiments, the process 700 may continue receiving, from remaining network nodes of the set of network nodes, additional routing information corresponding to the route prefix (block 730).

However, if the update criteria is satisfied, in further embodiments, the process 700 may propagate the received routing information corresponding to the route prefix to the routing table (block 740). In some examples, if routing information corresponding to the route prefix is received from each network node of the set of network nodes, the process 700 may propagate or download the received routing information from the set of network nodes to the routing table. In further examples, if additional routing information corresponding to the route prefix is yet to be received from at least one network node of the set of network nodes and the timer expires, the process 700 may propagate or download the received routing information corresponding to the route prefix to the routing table regardless of whether the additional routing information corresponding to the route prefix is received from the at least one network node.

Although a specific embodiment for propagating routing information suitable for carrying out the various steps, processes, methods, and operations described herein is discussed with respect to FIG. 7, any of a variety of systems and/or processes may be utilized in accordance with embodiments of the disclosure. For example, the update criteria can define a minimum number of network nodes of a next hop group for which the routing information can be propagated to the routing table in one go. The minimum number of network nodes can be defined based on configuration of the network fabric and data center tier. The elements depicted in FIG. 7 may also be interchangeable with other elements of FIG. 1-6 and FIG. 8 as required to realize a particularly desired embodiment.

Figure 8:
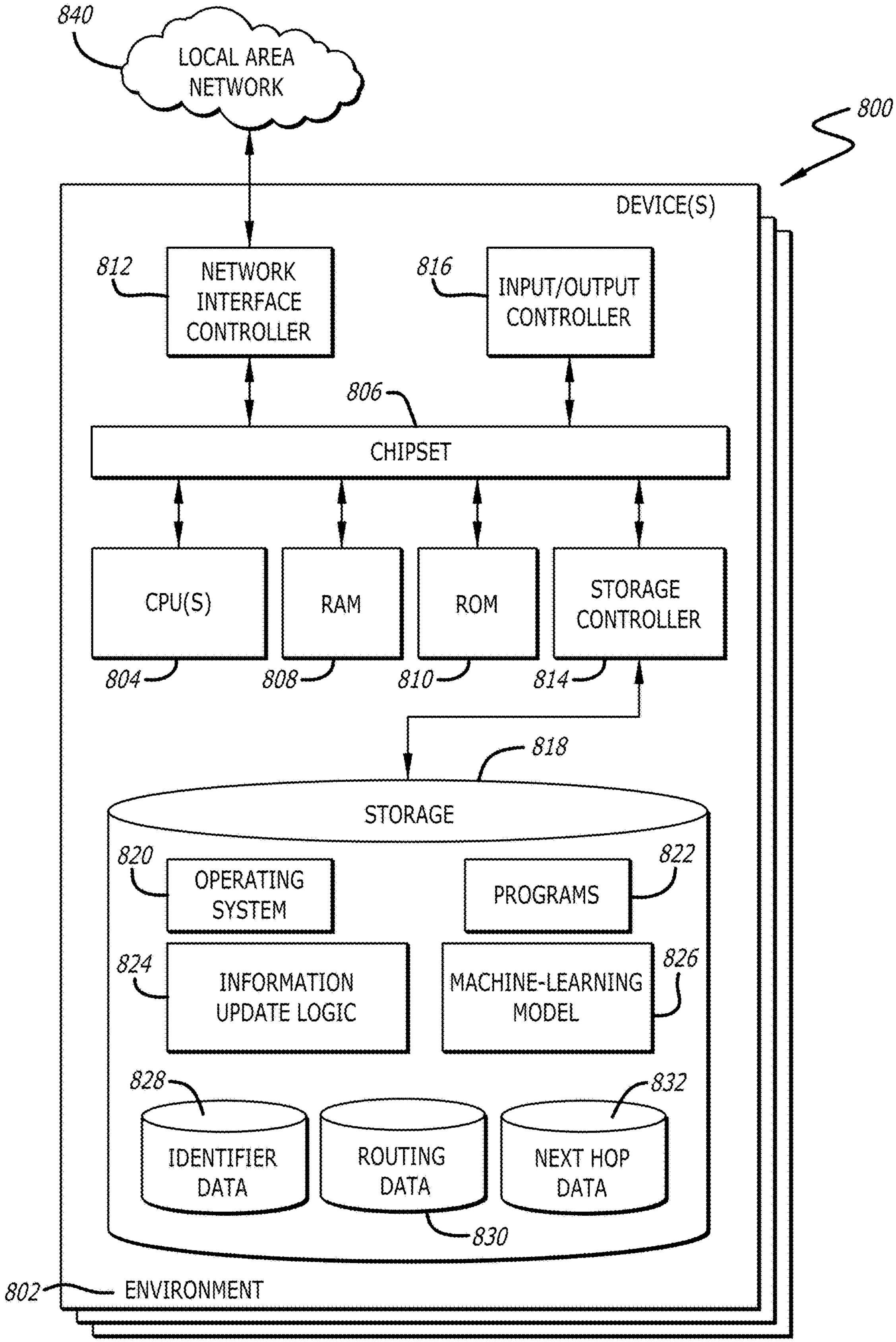
FIG. 8 is a conceptual block diagram of a device suitable for configuration with an information update logic in accordance with various embodiments of the disclosure.

Referring to FIG. 8, a conceptual block diagram of a device 800 suitable for configuration with an information update logic in accordance with various embodiments of the disclosure is shown. The embodiment of the conceptual block diagram depicted in FIG. 8 can illustrate a conventional server, switch, wireless LAN controller, access point, computer, workstation, desktop computer, laptop, tablet, network appliance, e-reader, smartphone, a BGP speaker, or other computing device, and can be utilized to execute any of the application and/or logic components presented herein. The embodiment of the conceptual block diagram depicted in FIG. 8 can also illustrate an access point, a switch, or a router in accordance with various embodiments of the disclosure. The device 800 may, in many non-limiting examples, correspond to physical devices or to virtual resources described herein.

In many embodiments, the device 800 may include an environment 802 such as a baseboard or "motherboard," in physical embodiments that can be configured as a printed circuit board with a multitude of components or devices connected by way of a system bus or other electrical communication paths. Conceptually, in virtualized embodiments, the environment 802 may be a virtual environment that encompasses and executes the remaining components and resources of the device 800. In more embodiments, one or more processors 804, such as, but not limited to, central processing units ("CPUs") can be configured to operate in conjunction with a chipset 806. The processor(s) 804 can be standard programmable CPUs that perform arithmetic and logical operations necessary for the operation of the device 800.

In a number of embodiments, the processor(s) 804 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 806 may provide an interface between the processor(s) 804 and the remainder of the components and devices within the environment 802. The chipset 806 can provide an interface to a random-access memory ("RAM") 808, which can be used as the main memory in the device 800 in some embodiments. The chipset 806 can further be configured to provide an interface to a computer-readable storage medium such as a read-only memory ("ROM") 810 or non-volatile RAM ("NVRAM") for storing basic routines that can help with various tasks such as, but not limited to, starting up the device 800 and/or transferring information between the various components and devices. The ROM 810 or NVRAM can also store other application components necessary for the operation of the device 800 in accordance with various embodiments described herein.

Additional embodiments of the device 800 can be configured to operate in a networked environment using logical connections to remote computing devices and computer systems through a network, such as the network 840. The chipset 806 can include functionality for providing network connectivity through a network interface card ("NIC") 812, which may include a gigabit Ethernet adapter or similar component. The NIC 812 can be capable of connecting the device 800 to other devices over the network 840. It is contemplated that multiple NICs 812 may be present in the device 800, connecting the device to other types of networks and remote systems.

In further embodiments, the device 800 can be connected to a storage 818 that provides non-volatile storage for data accessible by the device 800. The storage 818 can, for instance, store an operating system 820, applications 822, and data 828, 830, and 832, which are described in greater detail below. The storage 818 can be connected to the environment 802 through a storage controller 814 connected to the chipset 806. In certain embodiments, the storage 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 800 can store data within the storage 818 by transforming the physical state of the physical storage units to reflect the information being stored. The specific transformation of physical state can depend on various factors. Examples of such factors can include, but are not limited to, the technology used to implement the physical storage units, whether the storage 818 is characterized as primary or secondary storage, and the like.

In many more embodiments, the device 800 can store information within the storage 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 800 can further read or access information from the storage 818 by detecting the physical states or characteristics of one or more particular locations within the physical storage units.

In addition to the storage 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800. In some examples, the operations performed by a cloud computing network, and or any components included therein, may be supported by one or more devices similar to device 800. Stated otherwise, some or all of the operations performed by the cloud computing network, and or any components included therein, may be performed by one or more devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 818 can store an operating system 820 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 818 can store other system or application programs and data utilized by the device 800.

In many additional embodiments, the storage 818 or other computer-readable storage media is encoded with computer-executable instructions which, when loaded into the device 800, may transform it from a general-purpose computing system into a special-purpose computer capable of implementing the embodiments described herein. These computer-executable instructions may be stored as application 822 and transform the device 800 by specifying how the processor(s) 804 can transition between states, as described above. In some embodiments, the device 800 has access to computer-readable storage media storing computer-executable instructions which, when executed by the device 800, perform the various processes described above with regard to FIG. 1-7. In certain embodiments, the device 800 can also include computer-readable storage media having instructions stored thereupon for performing any of the other computer-implemented operations described herein.

In many further embodiments, the device 800 may include an information update logic 824. The information update logic 824 can be configured to perform one or more of the various steps, processes, operations, and/or other methods that are described above. Often, the information update logic 824 can be a set of instructions stored within a non-volatile memory that, when executed by the processor (s)/controller(s) 804 can carry out these steps, etc. In some embodiments, the information update logic 824 may be a client application that resides on a network-connected device, such as, but not limited to, a server, switch, a network node, personal or mobile computing device in a single or distributed arrangement.

In numerous embodiments, the information update logic 824 may be configured to identify, among a plurality of network nodes communicatively coupled to the device 800, a set of network nodes associated with a common identifier. The plurality of network nodes may include leaf switches or other network nodes coupled to the device 800. The common identifier may include, for example, ASN associated with the set of network nodes. In an example, identification of the set of network nodes associated with a common ASN may correspond to identifying a next hop group based on assigned ASNs. The information update logic 824 may receive, from one or more network nodes of the set of network nodes, routing information corresponding to a route prefix. A "route prefix" may specify the initial segment of an IP address that defines the network portion, used in routing decisions. For example, in an IP version 4 (IPv4) address with a subnet mask of /24, the first 24 bits may represent the route prefix, indicating the specific network.

In various embodiments, the information update logic 824 may further determine whether the routing information corresponding to the route prefix is received from each of the set of network nodes. In response to determining that the routing information corresponding to the route prefix is received from each network node in the set, the information update logic 824 may propagate the received routing information to a routing table. If routing information corresponding to the route prefix is not received from at least one network node of the set of network nodes, the information update logic 824 may stall the propagation of the received routing information to the routing table until the routing information corresponding to the route prefix is received from the at least one network node as well. The information update logic 824 may further be configured to set a timer for a time interval whenever routing information is received from the one or more network nodes in the set of network nodes. At the expiration of the timer, the information update logic 824 may be configured to propagate the received routing information to the routing table irrespective of whether additional routing information corresponding to the route prefix is yet to be received from at least one network node of the set of network nodes. That is to say, if the additional routing information corresponding to the route prefix is not received from the at least one network node at the expiration of the timer, the information update logic 824 may still propagate a current state of the routing information corresponding to the route prefix to the routing table at the expiration of the timer.

In numerous additional embodiments, the identifier data 828 may comprise information that uniquely identifies various network entities, such as nodes, devices, or routes. In the context of a data center, the identifier data 828 may include elements such as IP addresses, ASNs, and route prefixes. For example, ASNs are used to group sets of network nodes under a common identifier, facilitating the management and routing of data within the network. Route prefixes specify particular address ranges and are used by protocols like BGP to advertise routing information between network nodes.

In various embodiments, the routing data 830 may include route prefix data, for example, a range of IP addresses within a network. The routing data 830 is utilized by routing protocols such as BGP to advertise available routes between different network nodes. For example, a route prefix might denote the address range 192.168.1.0/24, encompassing all IP addresses from 192.168.1.0 to 192.168.1.255. By sharing the route prefix information, the device 800 can determine the best paths for data packets to reach their destinations. In further embodiments, the routing data 830 may include a routing table maintained by the device 800 for routing purposes. Examples of the routing table may include FIB, RIB, or the like.

In a number of embodiments, the next hop data 832 may include information regarding next hop groups identified by the device 800. The next hop data 832 can be utilized by the device 800 to determine the most efficient path for data transmission. Further, the next hop data 832 may include a next hop table listing next hop groups within each ASN from which the device 800 expects to learn given route prefixes.

In still further embodiments, the device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can be configured to provide output to a display, such as a computer monitor, a flat panel display, a digital projector, a printer, or other type of output device. Those skilled in the art will recognize that the device 800 might not include all of the components shown in FIG. 8 and can include other components that are not explicitly shown in FIG. 8 or might utilize an architecture completely different than that shown in FIG. 8.

As described above, the device 800 may support a virtualization layer, such as one or more virtual resources executing on the device 800. In some examples, the virtualization layer may be supported by a hypervisor that provides one or more virtual machines running on the device 800 to perform functions described herein. The virtualization layer may generally support a virtual resource that performs at least a portion of the techniques described herein.

Finally, in numerous additional embodiments, data may be processed into a format usable by a machine-learning model 826 (e.g., feature vectors), and or other pre-processing techniques. The machine-learning ("ML") model 826 may be any type of ML model, such as supervised models, reinforcement models, and/or unsupervised models. The ML model 826 may include one or more of linear regression models, logistic regression models, decision trees, Naïve Bayes models, neural networks, k-means cluster models, random forest models, and/or other types of ML models 826. The ML model 826 may be configured to learn about the identifier data 828, the routing data 830, and the next hop data 832 to figure out the best routing strategy for delivering data packets across various network nodes in a data center. In an example embodiment, the ML model 826 may be trained on network performance data, including latency and propagation delay associated with a next hop group. By learning patterns and correlations in this data, the ML model 826 may predict an optimal time interval for configuring the timer. The timer is configured with a time interval based on historic performance of members of the next hop group.

The ML model(s) 826 can be configured to generate inferences to make predictions or draw conclusions from data. An inference can be considered the output of a process of applying a model to new data. This can occur by learning from at least the identifier data 828, the routing data 830, and the next hop data 832. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 826 may be generated by human/administrator verifications or may compare predicted outcomes with actual outcomes.

Although a specific embodiment for a device suitable for configuration with the assisted roaming logic for carrying out the various steps, processes, methods, and operations described herein is discussed with respect to FIG. 8, any of a variety of systems and/or processes may be utilized in accordance with embodiments of the disclosure. For example, the device 800 may be in a virtual environment such as a cloud-based network administration suite, or it may be distributed across a variety of network devices or APs. The elements depicted in FIG. 8 may also be interchangeable with other elements of FIG. 1-7 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:

a processor;

a network interface controller configured to provide access to a network comprising a plurality of network nodes; and a memory communicatively coupled to the processor, wherein the memory comprises an information update logic that is configured to:

identify, among the plurality of network nodes, a set of network nodes associated with a common identifier;

receive, from one or more network nodes of the set of network nodes, routing information corresponding to a route prefix;

determine whether the routing information corresponding to the route prefix is received from each of the set of network nodes; and propagate the received routing information to a routing table in response to determining that the routing information is received from each of the set of network nodes.

2. The device of claim 1, wherein the routing table includes a routing information base.

3. The device of claim 1, wherein the routing table includes a forward information base.

4. The device of claim 1, wherein the information update logic is further configured to create a next hop table based on the identification of the set of network nodes associated with the common identifier.

5. The device of claim 4, wherein the next hop table includes an entry that maps the set of network nodes to the common identifier.

6. The device of claim 1, wherein propagating the routing information to the routing table includes downloading the routing information corresponding to the route prefix to the routing table.

7. The device of claim 1, wherein the common identifier is an autonomous system number (ASN).

8. The device of claim 1, wherein the device acts as a Border Gateway Protocol (BGP) speaker.

9. The device of claim 8, wherein the plurality of network nodes are BGP peers of the device.

10. The device of claim 1, wherein the information update logic is further configured to operate the set of network nodes associated with the common identifier as a single logical entity.

11. The device of claim 1, wherein the routing information corresponding to the route prefix is received in a random order from the one or more network nodes of the set of network nodes.

12. The device of claim 1, wherein the information update logic is further configured to stall the propagation of the routing information in response to determining that additional routing information corresponding to the route prefix is yet to be received from at least one network node of the set of network nodes.

13. A device, comprising:

a processor;

a network interface controller configured to provide access to a network comprising a plurality of network nodes; and a memory communicatively coupled to the processor, wherein the memory comprises an information update logic that is configured to:

identify, among the plurality of network nodes, a set of network nodes associated with a common identifier;

receive routing information corresponding to a route prefix from one or more network nodes of the set of network nodes;

activate a timer in response to receiving the routing information corresponding to the route prefix from the one or more network nodes; and propagate the received routing information corresponding to the route prefix to a routing table in response to an expiration of the timer.

14. The device of claim 13, wherein the timer is associated with a configurable time interval.

15. The device of claim 13, wherein the information update logic is further configured to determine that additional routing information corresponding to the route prefix is yet to be received from at least one network node of the set of network nodes.

16. The device of claim 15, wherein the information update logic is further configured to propagate the received routing information to the routing table in response to the expiration of the timer regardless of whether the additional routing information corresponding to the route prefix is received from the at least one network node of the set of network nodes.

17. A method, comprising:

identifying, among a plurality of network nodes, a set of network nodes associated with a common identifier;

receiving, from one or more network nodes in the set of network nodes, routing information corresponding to a route prefix;

determining whether the routing information corresponding to the route prefix is received from each of the set of network nodes; and propagating the received routing information to a routing table based on the update criteria for the route prefix being satisfied.

18. The method of claim 17, wherein the received routing information is propagated to the routing table in response to determining that the routing information is received from each of the set of network nodes.

19. The method of claim 17, wherein determining whether the update criteria for the route prefix is satisfied includes determining whether a timer associated with the route prefix has expired, and wherein the received routing information is propagated to the routing table in response to the expiration of the timer.

* * * * *